US010906571B2

(12) United States Patent
    Mian

(10) Patent No.: US 10,906,571 B2
(45) Date of Patent: Feb. 2, 2021

(54) RAILWAY VEHICLE OPERATIONS MONITORING

(71) Applicant: International Electronic Machines Corporation, Troy, NY (US)

(72) Inventor: Zahid F. Mian, Loudonville, NY (US)

(73) Assignee: International Electronic Machines Corp., Troy, NY (US)

(*) Notice: Subject to any disclaimer, the term of this patent is extended or adjusted under 35 U.S.C. 154(b) by 194 days.

(21) Appl. No.: 15/412,722

(22) Filed: Jan. 23, 2017

(65) Prior Publication Data

US 2017/0210401 A1    Jul. 27, 2017

Related U.S. Application Data

(60) Provisional application No. 62/281,951, filed on Jan. 22, 2016, provisional application No. 62/321,456, (Continued)

(51) Int. Cl.
    *B61L 15/00* (2006.01)
    *H04W 4/00* (2018.01)
    (Continued)

(52) U.S. Cl.
    CPC .......... *B61L 15/0081* (2013.01); *B61L 3/008* (2013.01); *B61L 15/0027* (2013.01);
    (Continued)

(58) Field of Classification Search
    CPC .. B61L 15/00; B61L 15/0018; B61L 15/0027; B61L 15/0054; B61L 15/0063;
    (Continued)

(56) References Cited

U.S. PATENT DOCUMENTS 5,036,478 A * 7/1991 MacDougall ............. B61L 1/14
                                                              702/158
6,411,870 B1 * 6/2002 Sato ........................ B60T 7/124
                                                              33/287
(Continued)

FOREIGN PATENT DOCUMENTS

EP     1600351 A1   11/2005
WO    95-31053 A1   11/1995

OTHER PUBLICATIONS

Linx Technologies, "Guide to Wireless Regulations in the United States," 2014, Linx Technologies (Year: 2014).*
(Continued)

*Primary Examiner* — Thomas G Black
*Assistant Examiner* — Sara J Lewandroski
(74) *Attorney, Agent, or Firm* — LaBatt, LLC

(57) ABSTRACT

A solution for monitoring a railway vehicle is provided. A vehicle node and one or more sensor nodes are deployed on the railway vehicle. Each sensor node is configured to acquire data and communicate with the vehicle node only when certain conditions are met. The sensor node(s) and vehicle node can evaluate operating conditions to determine whether an alert should be sent to initiate action. In an illustrative application, the alert can correspond to excessive hunting by a wheelset of the rail vehicle which is posing a danger for derailment.

20 Claims, 14 Drawing Sheets

Related U.S. Application Data filed on Apr. 12, 2016, provisional application No. 62/326,962, filed on Apr. 25, 2016.

(51) Int. Cl.
  *B61L 27/00* (2006.01)
  *B61L 23/04* (2006.01)
  *B61L 3/00* (2006.01)
  *H04W 4/70* (2018.01)

(52) U.S. Cl.
  CPC ......... *B61L 15/0072* (2013.01); *B61L 23/042* (2013.01); *H04W 4/70* (2018.02)

(58) Field of Classification Search
  CPC .. B61L 15/0072; B61L 15/0081; B61L 23/00; B61L 23/005; B61L 23/02; B61L 27/04; B61L 3/00; B61L 3/006; B61L 3/008; B61L 3/16
  See application file for complete search history.

(56) References Cited

U.S. PATENT DOCUMENTS

| | | | | |
|---|---|---|---|---|
| 7,161,473 | B2* | 1/2007 | Hoshal | G01D 9/005 340/436 |
| 8,985,525 | B2 | 3/2015 | Toms | |
| 2006/0122745 | A1* | 6/2006 | Lueger | B61F 9/005 701/19 |
| 2006/0258322 | A1* | 11/2006 | Conner | H04W 52/0296 455/343.1 |
| 2008/0296441 | A1* | 12/2008 | Anderson | B61L 23/044 246/121 |
| 2008/0303513 | A1* | 12/2008 | Turner | G01P 3/488 324/160 |
| 2009/0300379 | A1 | 12/2009 | Mian et al. | |
| 2010/0155543 | A1 | 6/2010 | Hesser et al. | |
| 2014/0025256 | A1 | 1/2014 | Armitage et al. | |
| 2014/0372498 | A1* | 12/2014 | Mian | B61L 15/0072 709/201 |
| 2015/0051792 | A1* | 2/2015 | Kristen | B61L 99/00 701/34.2 |
| 2016/0152255 | A1* | 6/2016 | Cuthbertson | B61L 15/0027 701/19 |
| 2016/0214631 | A1* | 7/2016 | Hammerl | B61L 25/025 |
| 2017/0199101 | A1* | 7/2017 | Franchitti | B61K 9/00 |
| 2019/0156600 | A1* | 5/2019 | Potyrailo | B61C 17/08 |
| 2020/0304112 | A1* | 9/2020 | Zhang | H02H 1/0007 |

OTHER PUBLICATIONS

International Application No. PCT/US2017/014565, Search Report and Written and Opinion, dated May 1, 2017, 16 pages.

Lat-Lon, "Locomotive Monitoring Unit," Accessed on Jan. 9, 2017, 2 pages.

Lat-Lon, "Fleet Vehicle GPS Tracking," Accessed on Jan. 9, 2017, 2 pages.

* cited by examiner

RAILWAY VEHICLE OPERATIONS MONITORING

REFERENCE TO RELATED APPLICATIONS

The current application claims the benefit of: U.S. Provisional Application No. 62/281,951, which was filed on 22 Jan. 2016; U.S. Provisional Application No. 62/321,456, which was filed on 12 Apr. 2016; and U.S. Provisional Application No. 62/326,962, which was filed on 25 Apr. 2016, each of which is hereby incorporated by reference.

TECHNICAL FIELD

The disclosure relates generally to railway vehicle monitoring, and more particularly, to monitoring operation of a railway vehicle for one or more alert conditions.

BACKGROUND ART

Current art systems exist which use simple methods to monitor the status of train cars. However, these systems have several inherent limitations in their ability to detect and to alert reliably on a problematic situation. For example, Lat-Lon, LLC offers monitoring units capable of recognizing simple conditions. In particular, the units can recognize relevant conditions that are identifiable using a very simplistic thresholding approach or on/off signals from specific types of sensors (e.g., door or valve open/closed), which can be used to activate a switch. This severely limits the ability of the Lat-Lon monitoring units to accurately detect derailments or collisions. For example, the thresholding of acceleration at some particular level can be falsely triggered by phenomena such as slid flats, which cause high impact accelerations whenever the wheel reaches the flat spot on its surface. Additionally, simplistic yes/no analyses do not permit the monitoring units to recognize and alert on incipient disasters and therefore possibly prevent derailments.

The power available for current art also tends to strongly limit transmission capability. Sensor nodes placed on the outside of a railcar, especially on the top surface, have a good chance of obtaining significant power from solar energy, as solar is a relatively dense (compared to other power harvesting) energy source. However, sensor nodes placed in other locations on the car (e.g., the wheel truck, interior or undercarriage) will have erratic and often very low-level energy available through vibration or possibly other harvesting sources. Typical wireless networks operate in the 900 MHz and 2.4 GHz regimes. Unfortunately, transmission range tends to drop with higher wavelengths, or, conversely, far greater power is required to transmit reliably over a given distance at higher wavelengths. At typical transmission power for wireless self-powered networks (~1 mW), the range of networks in these bands can be measured in tens of feet even in good conditions. Railroad settings are often very poor conditions.

To overcome these limitations, some approaches have attempted operations in other transmission bands. However, legal restrictions regarding operation in some of the more appealing bands, such as 433 MHz, severely limit the capabilities of such networks, even though the technical performance in these bands is significantly greater.

SUMMARY OF THE INVENTION

Aspects of the invention provide a solution for monitoring a railway vehicle. A vehicle node and one or more sensor nodes are deployed on the railway vehicle. Each sensor node is configured to acquire data and communicate with the vehicle node only when certain conditions are met. The sensor node(s) and vehicle node can evaluate operating conditions to determine whether an alert should be sent to initiate action. In an illustrative application, the alert can correspond to excessive hunting by a wheelset of the rail vehicle which is posing a danger for derailment.

A first aspect of the invention provides a system for monitoring a railway vehicle comprising: a sensor node located on the railway vehicle, wherein the sensor node includes: a power harvesting component for generating power from an ambient condition of the sensor node; a sensing device for acquiring data corresponding to an operating parameter of the railway vehicle; means for processing the data acquired by the sensing device, wherein the means for processing includes: entering an active state from a sleep state in response to data acquired by the sensing device; determining whether a sensor alert condition is present from the data; providing a sensor alert for processing on a vehicle node in response to a determination that the sensor alert condition is present; and returning to the sleep state regardless of whether the sensor alert is confirmed by the vehicle node.

A second aspect of the invention provides a railway monitoring system comprising: a vehicle node located on a railway vehicle; and a plurality of wireless sensor nodes located on the railway vehicle, wherein each of the plurality of wireless sensor nodes includes: a power harvesting component for generating power from an ambient condition of the wireless sensor node; a sensing device for acquiring data corresponding to an operating parameter of the railway vehicle; a transceiver for communicating with the vehicle node; means for processing the data acquired by the sensing device, wherein the means for processing includes: entering an active state from a sleep state in response to data acquired by the sensing device; determining whether a sensor alert condition is present from the data; transmitting, using the transceiver, a sensor alert for processing on the vehicle node in response to a determination that the sensor alert condition is present; and returning to the sleep state regardless of whether the sensor alert is confirmed by the vehicle node.

A third aspect of the invention provides a railway monitoring system comprising: a vehicle node located on a railway vehicle, wherein the vehicle node includes: a power harvesting component for generating power from an ambient condition of the vehicle node; a first transceiver for communicating with a plurality of sensor nodes; a second transceiver for communicating with a management system, wherein the first and second transceivers use distinct wireless communications solutions; and means for processing a sensor alert received from one of the plurality of sensor nodes, wherein the means for processing includes: acquiring additional data regarding the railway vehicle; processing the sensor alert and the additional data to determine whether a vehicle alert condition is present; and transmitting a vehicle alert for processing by the management system in response to determining the vehicle alert condition is present; and a plurality of wireless sensor nodes located on the railway vehicle, wherein each of the plurality of wireless sensor nodes includes: a power harvesting component for generating power from an ambient condition of the sensor node; a sensing device for acquiring data corresponding to an operating parameter of the railway vehicle; and a transceiver for transmitting a sensor alert comprising the data corresponding to the operating parameter for processing by the vehicle node.

Embodiments of the invention can overcome one or more limitations of current approaches for monitoring train car status. Such limitations can include one or more conditions not currently monitored, such as recognizing conditions which may lead to damage or derailment. Additionally, such limitations can include one or more problems limiting the success of prior approaches, such as providing a reliable wireless network in the very challenging area of train operations.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
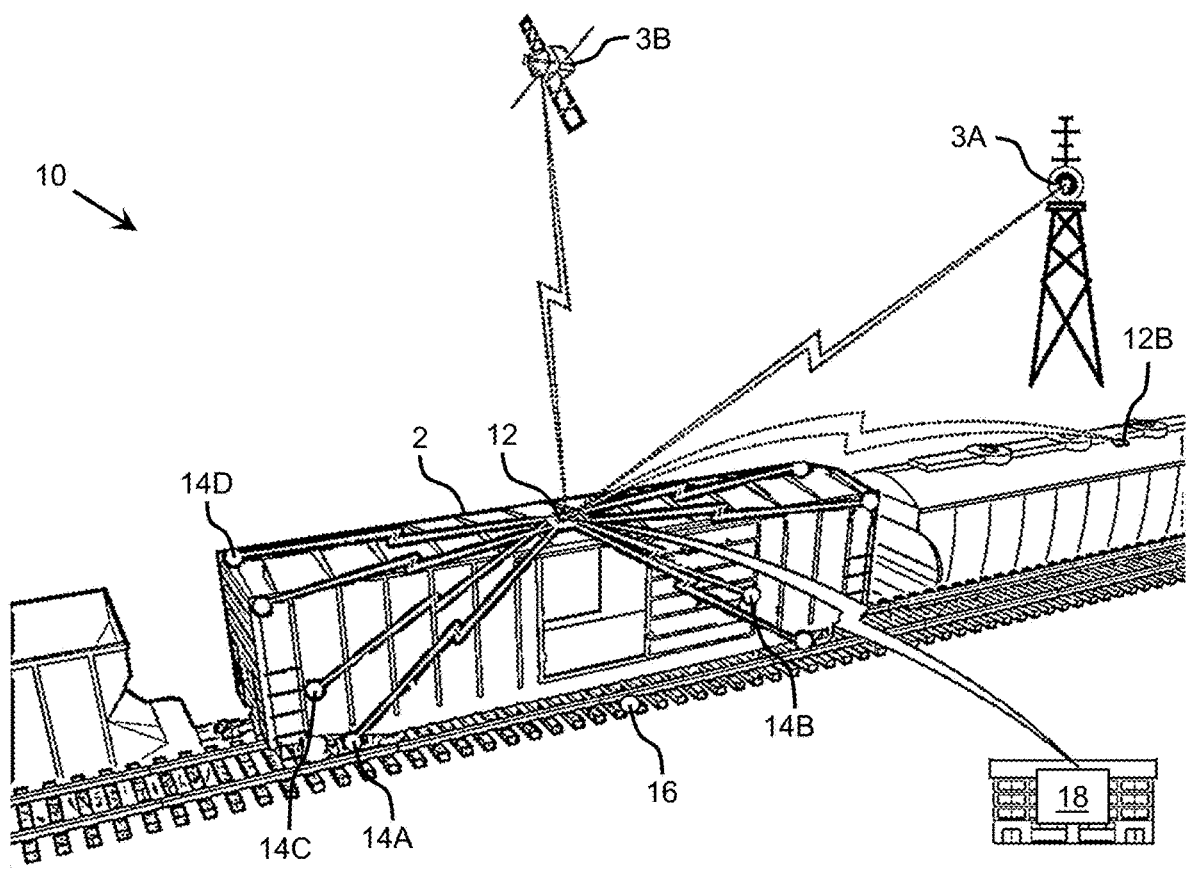
FIG. 1 shows an illustrative environment for monitoring an operational status of a railway vehicle according to an embodiment.

As indicated above, aspects of the invention provide a solution for monitoring a railway vehicle. A vehicle node and one or more sensor nodes are deployed on the railway vehicle. Each sensor node is configured to acquire data and communicate with the vehicle node only when certain conditions are met. The sensor node(s) and vehicle node can evaluate operating conditions to determine whether an alert should be sent to initiate action. In an illustrative application, the alert can correspond to excessive hunting by a wheelset of the rail vehicle which is posing a danger for derailment.

As used herein, unless otherwise noted, the term "set" means one or more (i.e., at least one) and the phrase "any solution" means any now known or later developed solution. It is understood that, unless otherwise specified, each value is approximate and each range of values included herein is inclusive of the end values defining the range. As used herein, unless otherwise noted, the term "approximately" is inclusive of values within +/− ten percent of the stated value, while the term "substantially" is inclusive of values within +/− five percent of the stated value.

Embodiments of the invention described herein can overcome one or more limitations of current art solutions of monitoring railway vehicle status. An embodiment of the invention can recognize one or more conditions which may lead to damage or derailment. Furthermore, embodiments of the invention described herein can overcome one or more limitations with respect to operating a reliable wireless network in the very challenging area of train operations. An illustrative embodiment includes a railway vehicle including multiple sensor nodes placed in various locations, each of which reports to a vehicle node using a specialized radio operational protocol. The sensor nodes use data processing approaches to eliminate spurious and irrelevant signals and to recognize signatures of specific events, such as precursors to derailment. When such circumstances are recognized, the sensor nodes send alerts to the vehicle node, which can wirelessly alert on or off-train management system(s) to interfaces or systems which may act upon the alert.

An illustrative sensor node can include: at least one sensing device for acquiring data corresponding to some phenomenon or parameter; at least one power harvesting device appropriate to the mounting location of the sensor node; a power system for receiving, storing, and providing power to other components of the sensor node; a data storage and processing component; a transceiver; and software for execution by the data storage and processing system, which controls operation of the sensor node and evaluates the data therefrom, as well as directs communication with the vehicle node. An illustrative vehicle node can include: at least one power harvesting device (e.g., solar power harvester) appropriate to the mounting location of the vehicle node; a power system for receiving, storing, and providing power to other components of the vehicle node; a data storage and processing component; one or more transceivers; and software for execution by the data storage and processing system, which controls operation of the vehicle node and receives data from at least one sensor node, and controls communications with other sensor nodes and management systems.

A monitoring system described herein can monitor operations of a railway vehicle for a set of conditions of interest. The sensor node and/or vehicle node can utilize algorithms/heuristics for generating alerts based on those conditions from the processed data. Such an algorithm can include: acquiring data from the sensing device(s) of at least one sensor node; processing the data on the sensor node and/or vehicle node; comparing results of the processed data with one or more provided conditional limits; arriving at an alert decision based on the comparison; and transmitting any alert to at least one interested party. One or more interested parties can make use of the alerts. The alerts can be transmitted to a management system of each interested party.

An embodiment of a monitoring system described herein can comprise a wireless sensor arrangement which is based on energy harvesting. The wireless sensor nodes can use any combination of one or more of multiple energy harvesting methods including vibration, light, radio frequency, thermal, acoustic, and/or the like, thereby requiring no external power source for sensing data and/or communicating with a vehicle node. All sensor and vehicle nodes in the monitoring system can utilize energy harvesting and power preserving operations in such a manner so as to not require any external power source. In contrast, the present art does not provide an entire train sensor network which utilizes power harvesting, and thereby rely on batteries with limited life, need to charge batteries, etc. Furthermore, the present state of the art relies on unidirectional sensors, which do not provide an adequate sensor health check, sensor communication verification, or unique signature from sensor nodes which can allow a sensor network for a railway vehicle to operated within the presence of many other railway vehicles on a train.

Turning to the drawings, FIG. 1 shows an illustrative environment 10 for monitoring an operational status of a railway vehicle 2 according to an embodiment. As illustrated, the railway vehicle 2 can comprise a freight car. However, it is understood that a freight car is only illustrative of various types of railway vehicles in conjunction with which embodiments of the invention can be implemented. To this extent, other types of railway vehicles include differently configured freight railway vehicles for shipping goods (e.g., refrigerated railway vehicle, a flatbed railway vehicle, a tank railway vehicle, and/or the like), passenger (transit) railway vehicles for transporting people, and/or the like. Additionally, embodiments of the invention can be implemented in conjunction with railway vehicles that include onboard motive power, including locomotives, self-propelled railway vehicles, and/or the like.

Regardless, the railway vehicle 2 is shown including a vehicle node 12, which can communicate with a set of sensor nodes 14A-14D located in any combination of various locations of the railway vehicle 2. As illustrated, the vehicle node 12 can be placed in a location that facilitates communication with sensor nodes 14A-14D located anywhere on the railway vehicle 2. To this extent, in an embodiment, the vehicle node 12 can be placed in a central location of a roof of the railway vehicle 2. However, it is understood that this is only illustrative and other locations may be utilized. For example, in embodiments where the railway vehicle 2 lacks a roof, the vehicle node 12 can be placed on a side of the railway vehicle 2. Furthermore, in embodiments where the sensor nodes 14A-14D are located within only a portion of the railway vehicle 2, the location of the vehicle node 12 can be placed in a location closer to the locations of the sensor nodes 14A-14D.

The railway vehicle 2 can include any number of sensor nodes 14A-14D, each of which is configured to acquire data corresponding to one or more operating parameters of the railway vehicle 2. In embodiments, the locations can include one or more locations of a wheel truck of the railway vehicle 2 (e.g., as illustrated by sensor node 14A). In this case, the sensor node(s) 14A can be configured to acquire data corresponding to one or more operating parameters of a rail wheel, a brake, bearings, supporting structure, and/or the like. Furthermore, the railway vehicle 2 can include sensor node(s) configured to monitor a status of equipment of the railway vehicle 2, such as a sensor node 14B which can acquire data regarding an open/closed status of a door, a sensor node 14C which can acquire data regarding an external ladder, and/or the like. Still further, the railway vehicle 2 can include one or more sensor nodes, such as the sensor node 14D, which are configured to acquire data corresponding to the movement of the railway vehicle 2. Such data can include data regarding the side to side movement, up/down movement, acceleration data, orientation data, and/or the like. It is understood that the locations and data described in conjunction with the sensor nodes 14A-14D are only illustrative, and various types of sensors, sensor locations (including outside and inside the vehicle), and data, regarding the operating parameter(s) of various types and combinations of equipment on the railway vehicle 2 can be utilized in embodiments of the invention.

In an embodiment, some or all of the sensor nodes 14A-14D can communicate with the vehicle node 12 using a wireless communications solution, such as a wireless radio link. However, it is understood that one or more of the sensor nodes 14A-14D can utilize a wired communications solution to communicate with the vehicle node 12. The sensor nodes 14A-14D can be configured to communicate directly with the vehicle node 12 and/or communicate indirectly with the vehicle node 12 using one or more other sensor nodes 14A-14D as an intermediary communication device. In an embodiment, the vehicle node 12 and/or sensor nodes 14A-14D are assigned a unique identification upon being deployed to a railway vehicle, which allows the nodes 12, 14A-14D to determine which nodes belong to the railway vehicle and which nodes are located on another railway vehicle. For example, the unique identification can correspond to a unique identifier for the railway vehicle, and deployment of the vehicle node 12 and/or sensor nodes 14A-14D can include providing the unique identifier for inclusion in wireless communications between the nodes 12, 14A-14D.

Additionally, an embodiment of the vehicle node 12 can be configured to communicate with one or more additional devices. For example, the vehicle node 12 can be configured to communicate with a second vehicle node 12B, which is located on another railway vehicle connected to the railway vehicle 2 (e.g., as part of a consist or train). Additionally, the vehicle node 12 can communicate with one or more management systems 18, each of which can be configured to manage operations of a railroad, a train, a classification yard, a group of railway vehicles (e.g., owned by the same entity), and/or the like, within which the railway vehicle 2 is operating. For example, a management system 18 can comprise a local data collection and analysis substation (e.g., at a classification yard), a railroad and/or shipping company information technology system, and/or the like.

Communications with the second vehicle node 12B and/or the management system 18 can be implemented using a direct radio link, as illustrated. Such communications can use the same wireless communications solution utilized in conjunction with communications with the sensor node(s) 14A-14D. Alternatively, the communications can be indirect using, for example, an intermediary vehicle node. In an embodiment, the vehicle node 12 includes utilizes a distinct wireless communications solution for communications with other vehicle nodes 12B and/or management system(s) 18. To this extent, illustrative wireless communications can utilize a cell tower 3A (which enables communications with a management system connected to a public telephone network), a satellite 3B (which can enable communications with a management system located in any of a wide range of remote locations), and/or the like.

Figure 2A:
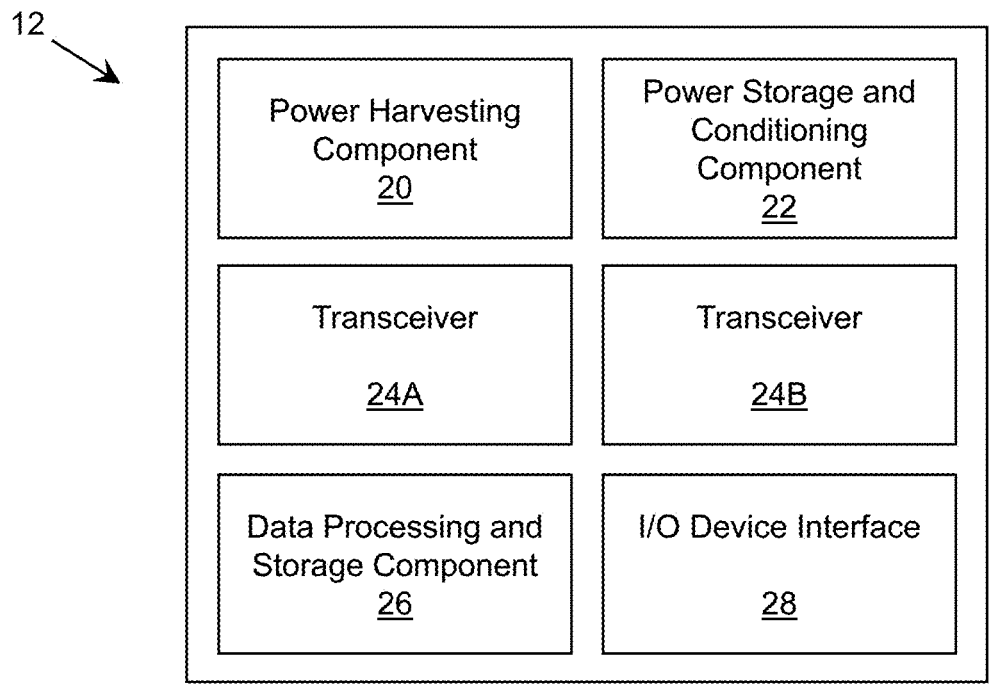
FIGS. 2A and 2B show functional diagrams of an illustrative vehicle node and sensor node, respectively, according to embodiments.
Figure 2B:
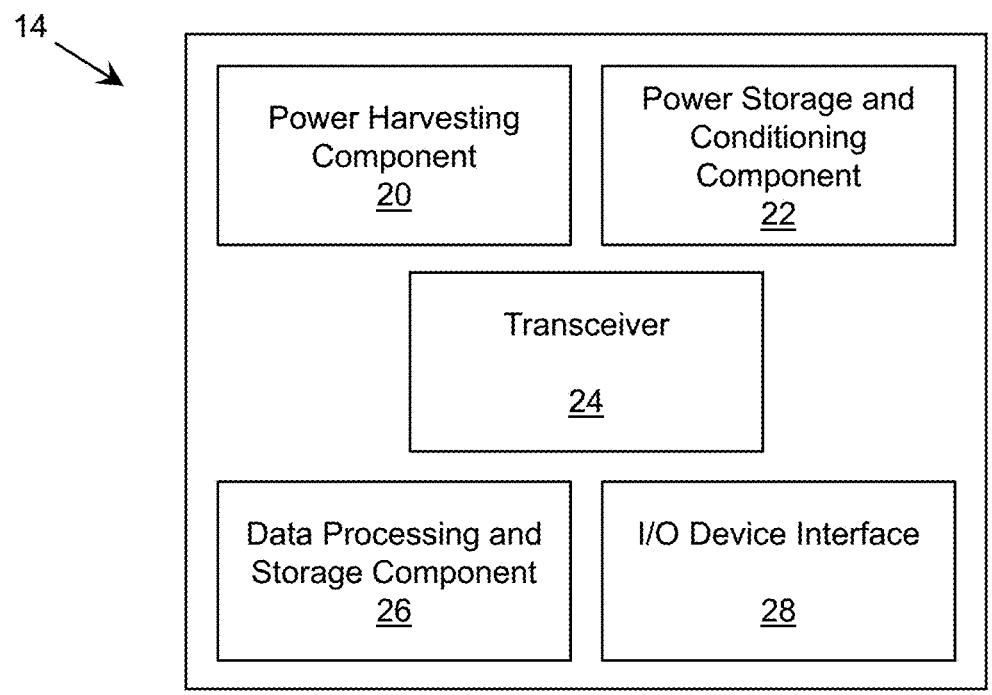

FIGS. 2A and 2B show functional diagrams of an illustrative vehicle node 12 and sensor node 14, respectively, according to embodiments. As illustrated, each node 12, 14 can include a power harvesting component 20, which is configured to generate power from one or more ambient conditions of the environment within which the corresponding node 12, 14 is located. A suitable combination of one or more types of power harvesting devices for inclusion in the power harvesting component 20 can be selected based on the attributes of the ambient environment and anticipated power demands for the node 12, 14. In an embodiment, the vehicle node 12 can include a solar power harvester when the vehicle node 12 (or the power harvesting component 20 thereof) can be located at a location on the railway vehicle 2 (FIG. 1) which is exposed to a significant amount of sunlight, e.g., a roof of the railway vehicle 2, above a side of the railway vehicle 2, and/or the like. However, it is understood that any combination of one or more of various types of power harvesters can be implemented in conjunction with a node 12, 14. Other illustrative power harvesters can generate power from ambient motion, relative motion, vibration, heat, wind, and/or the like.

Regardless, the power harvesting component 20 can provide power to a power storage and conditioning component 22 of the corresponding node 12, 14. The power storage and conditioning component 22 can include a set of energy storage devices (e.g., batteries), which are configured to store sufficient energy to provide power to the node 12, 14 for a target operating duration without requiring recharging from the power harvesting component 20. Furthermore, the power storage and conditioning component 22 can include circuitry for conditioning the power generated by the power harvesting component 20 and provide suitable electricity to other components of the node 12, 14. The power storage and conditioning component 22 can be configured to prevent power surges, direct the power to the energy storage device and/or one or more other components of the node 12, 14, provide suitable alternating and/or direct current electricity for operating a device, and/or the like.

As discussed herein, each node 12, 14 can be configured for wireless communications. To this extent, each node 12, 14 can include one or more transceivers 24. In an embodiment, the vehicle node 12 includes two transceivers 24A, 24B, each of which communicates using a distinct wireless communications solution. For example, the transceiver 24A can enable communications with the sensor node 14 and/or another vehicle node 12, while the transceiver 24B can enable wireless communications over longer distances, such as with a monitoring system 18 (FIG. 1).

Each node also can include a data processing and storage component 26, and a set of input/output (I/O) device interfaces 28. The I/O device interface 28 can receive raw data acquired by a sensing device, which can be stored and/or processed by the data processing and storage component 26. Additionally, the I/O device interface 28 can enable communications with a human and/or another computer system via one or more corresponding I/O devices. Such communications can configure the node 12, 14 (e.g., as part of an initial deployment), update software for the data processing and storage component 26, and/or the like.

While the vehicle node 12 and the sensor node 14 have very similar functional diagrams, it is understood that the capabilities, sizes, and/or corresponding power requirements for the respective nodes can differ significantly. In an embodiment, the vehicle node 12 has significantly higher data processing and storage capabilities, transmission capabilities, and as a result, power requirements, than the sensor node 14. For example, the data processing and storage component 26 of the sensor node 14 can comprise an ultra low-power microprocessor.

Figure 3:
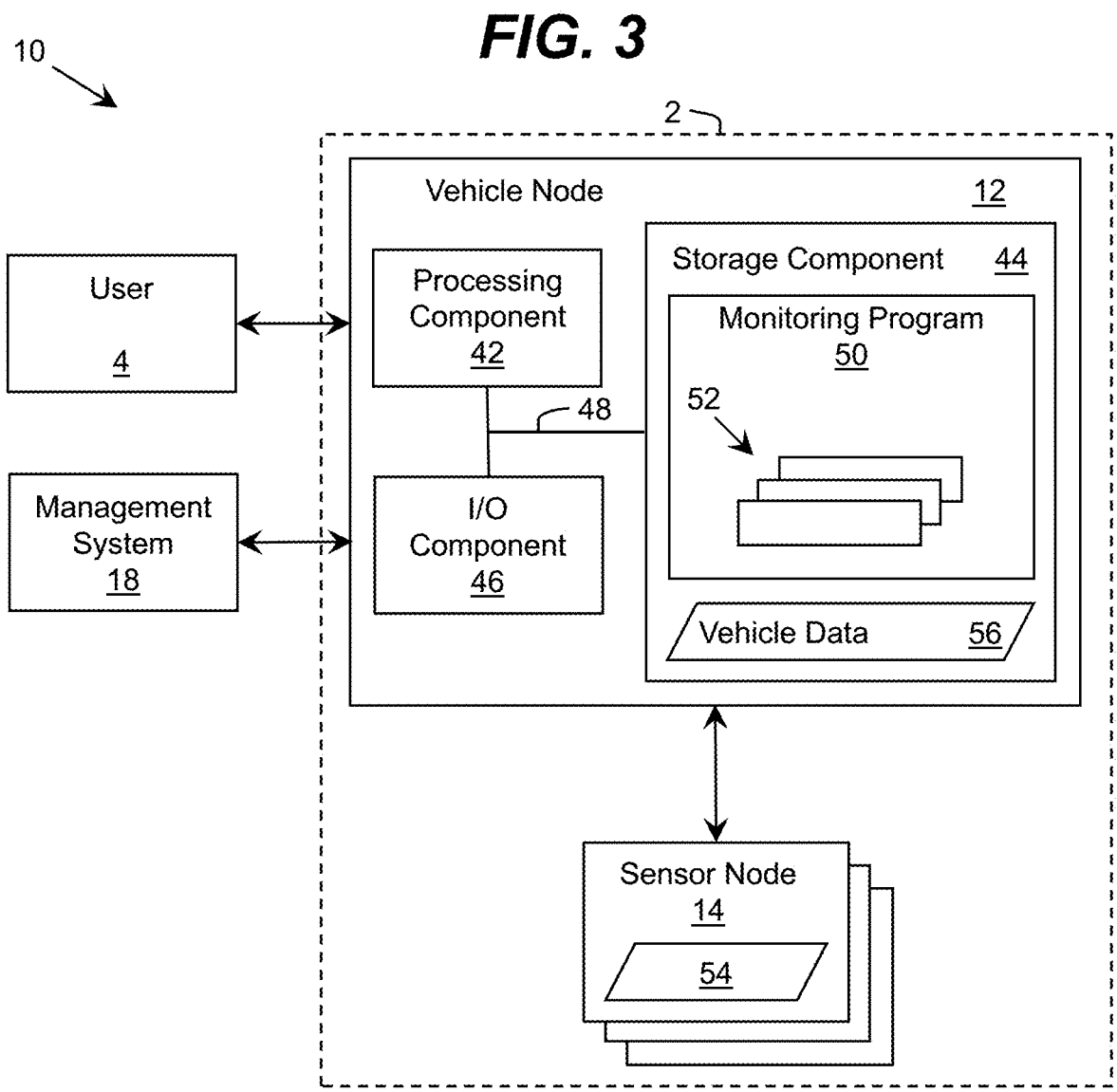
FIG. 3 shows a component view of an illustrative vehicle node included in a railway vehicle monitoring environment according to an embodiment.

FIG. 3 shows a component view of an illustrative vehicle node 12 included in a railway vehicle monitoring environment 10 according to an embodiment. In this case, the vehicle node 12 is implemented as a computer system including a monitoring program 50, which makes the vehicle node 12 operable to manage communications with various sensor nodes 14 located on a vehicle 2 and/or a management system 18, which can be located apart from the vehicle 2 by performing a process described herein. Additionally, the monitoring program 50 can make the vehicle node 12 operable to manage vehicle data 56 corresponding to the vehicle 12 by performing a process described herein.

As previously described, a vehicle node 12 can include a data processing and storage component 26 (FIG. 2A) and an I/O device interface 28 (FIG. 2A). To this extent, the vehicle node 12 is shown including a processing component 42 (e.g., one or more processors) and a storage component 44 (e.g., a storage hierarchy), which correspond to an illustrative implementation of the data processing and storage component 26 described herein. Additionally, the vehicle node 12 is shown including an input/output (I/O) component 46 (e.g., one or more I/O interfaces and/or devices), of which the I/O device interface 28 and transceiver(s) 24A-24B (FIG. 2A) described herein are an illustrative implementation.

In general, the processing component 42 executes program code, such as the monitoring program 50, which is at least partially fixed in the storage component 44. While executing program code, the processing component 42 can process data, which can result in reading and/or writing transformed data from/to the storage component 44 and/or the I/O component 46 for further processing. A communications pathway 48 provides a communications link between each of the components in the vehicle node 12. The I/O component 46 can comprise one or more human I/O devices, which enable a human user 4 to interact with the vehicle node 12 and/or one or more communications devices to enable a system user 4 and/or a management system 18 to communicate with the vehicle node 12 using any type of communications link. To this extent, the monitoring program 50 can manage a set of interfaces (e.g., graphical user interface(s), application program interface, and/or the like) that enable human and/or system users 4, 18 to interact with the monitoring program 50 and/or vehicle data 56. Furthermore, the monitoring program 50 can manage (e.g., store, retrieve, create, manipulate, organize, present, etc.) the data, such as the vehicle data 56, using any solution.

In any event, the vehicle node 12 can comprise one or more general purpose computing articles of manufacture (e.g., computing devices) capable of executing program code, such as the monitoring program 50, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the monitoring program 50 can be embodied as any combination of system software and/or application software.

Furthermore, the monitoring program 50 can be implemented using a set of modules 52. In this case, a module 52 can enable the vehicle node 12 to perform a set of tasks used by the monitoring program 50, and can be separately developed and/or implemented apart from other portions of the monitoring program 50. As used herein, the term "component" means any configuration of hardware, with or without software, which implements the functionality described in conjunction therewith using any solution, while the term "module" means program code that enables a vehicle node 12 to implement the actions described in conjunction therewith using any solution. When fixed in a storage component 44 of a computer system (e.g., the vehicle node 12) that includes a processing component 42, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the vehicle node 12.

When the vehicle node 12 comprises multiple computing devices, each computing device can have only a portion of the monitoring program 50 fixed thereon (e.g., one or more modules 52). However, it is understood that the vehicle node 12 and the monitoring program 50 are only representative of various possible equivalent computer systems that may perform a process described herein. To this extent, in other embodiments, the functionality provided by the vehicle node 12 and the monitoring program 50 can be at least partially implemented by one or more computing devices that include any combination of general and/or specific purpose hardware with or without program code. In each embodiment, the hardware and program code, if included, can be created using standard engineering and programming techniques, respectively. Other illustrative hardware embodiments include an application-specific integrated circuit (ASIC), a field-programmable gate array (FPGA), and/or the like.

In another illustrative embodiment, the vehicle node 12 and/or the sensor node 14 are implemented as part of a group monitoring system shown and described in U.S. patent application Ser. No. 14/306,322, filed on 17 Jun. 2014, which is hereby incorporated by reference. In this case, the vehicle node 12 can incorporate the various components and functionality described in conjunction with a vehicle node described therein, and the sensor node 14 can incorporate the various components and functionality described in conjunction with a sensor described therein. Furthermore, the management system 18 can incorporate the various components and functionality described in conjunction with a group system described therein.

In still another illustrative embodiment, the vehicle node 12 and/or the sensor node 14 are implemented as a processing node and/or a sensor node, respectively, as shown and described in U.S. patent application Ser. No. 12/469,167, filed on 20 May 2009, which is hereby incorporated by reference. In this case, the node 12, 14, can be implemented using a modular approach, which utilizes a core component including a processing component, memory, transceiver, and a set of interfaces for selectively connecting the core component to various sensing devices, power sources, additional data storage components, and/or the like.

Embodiments of the vehicle node 12 and the set of sensor nodes 14 can monitor various conditions and operating parameters of the corresponding railway vehicle using any combination of various solutions. For example, such monitoring can include the statuses of one or more switches, such as a switch indicating whether a given door or hatch is open, closed, or has changed state between open/closed, and/or the like. Similarly, such monitoring can include determining when a measured parameter (e.g., vibration, strain, temperature, and/or the like) is outside of an acceptable range of values (e.g., exceeds a threshold).

For example, there are numerous cases in which the owner/operator of a railway vehicle 2 desires to monitor when a hatch has opened, a valve has been turned, and so on. These involve components which may turn or open in various ways, and may be set at virtually any orientation on the car. This presents a significant challenge to traditional instrumentation, as most motion/orientation sensors require proper orientation and calibration, and thus any design of a sensor node 14 incorporating these sensors would encounter challenges of proper orientation upon installation, and some orientations might be difficult to achieve. Sensors that require contact to detect motion have their own challenges. For example, maintaining good contact in a setting where there is heavy physical use is difficult as many contact sensors do not deal well with even very small warping/separation of their components, and such small separations can easily occur through wear or warping of a door or valve.

In an embodiment, a sensor uses a self-calibrating, many-degrees-of-freedom sensor, such as the Bosch BNO055. In this case, an embodiment provides a single sensor node 14 design, which can be readily installed on any such lever, valve handle, hatch, and/or the like, and be able to sense motion/change in any of nine degrees of freedom (forward-backward, left-right, up-down, roll, pitch, yaw and three magnetometer degrees of freedom). Use of such a sensor can drastically reduce complexity of software design for the sensing and alerting on particular conditions, as well as greatly simplifying installation requirements. Such an approach also allows, if desired, monitoring of positions in more detail besides merely open-closed or on/off, as the precise degree of rotation or translation can be measured.

As discussed herein, the vehicle node 12 can communicate with one or more sensor nodes 14 using a wireless communications solution. However, in many applications, no ready power source is available on the railway vehicle 2 to provide power for operating the vehicle node 12 and/or the sensor node(s) 14. Furthermore, particularly in the rail freight transportation industry, an entity may have thousands of rail vehicles scattered throughout a wide geographic area, for each of which monitoring may be desired. Incorporation of a vehicle node 12 and sensor node(s) 14 described herein, which require periodic servicing, even to change a battery, may make the servicing costs prohibitive. Embodiments of the vehicle node 12 and a set of sensor nodes 14 improve on prior monitoring solutions by providing nodes 12, 14 capable of operating for many years (e.g., ten years or more) without maintenance.

An embodiment of the vehicle node 12 and/or sensor node(s) 14 can utilize power harvesting to generate new power, which can be stored for subsequent operation of the node 12, 14. In rail applications, vibration-based power harvesting can be utilized. However, such power harvesting has some limitations of power density and efficiency. The power density limitation means that to obtain a given amount of energy, at least a certain volume of space is required for the harvester (in addition to that needed for the other components of the node). The efficiency limitation means that the amount of power obtained from a harvester will only be a fraction of the energy theoretically available. In addition, some types of railway vehicles often spend considerable periods not moving. As a result, the node will not experience any vibrations to harvest. A node that is "always on," even only using 1 mW draw, can quickly exhaust any reasonable-size battery over a period of years.

A railway vehicle can include any combination of various types of sensor nodes, each of which can be configured to acquire data from one or more types of sensors and generate power from one or more ambient conditions. For example, a railway vehicle can include a sensor node 14 configured to evaluate wheel bearing temperature. For example, the sensor node 14 can comprise a thermopile-based temperature sensor, which can generate its own electricity whenever there is temperature differential. The bearing temperature sensor node can also use vibration-based electricity generation, which can charge a super capacitor, high performance long life lithium polymer, or other storage device, which is capable of charging for thousands of cycles while maintaining its charge level without depletion due to leakage.

A railway vehicle also can include a sensor node 14 configured to acquire wheel vibration data for a wheel/truck assembly. For example, the sensor node 14 can include an active accelerometer, which can generate an electrical signal based on vibration of the wheel/truck assembly without needing external power. To this extent, the accelerometer can comprise a piezoelectric accelerometer. In one embodiment, a piezoelectric material in the form of a cantilever can be used as a generator to harvest energy from an ambient vibration source and transform the energy into useful electrical output. The vibration source can be measured with a MEMS based accelerometer, which is powered by the transformation of electrical energy derived from the mechanical vibration source itself. At a resonant frequency of 78 Hz, or another tunable frequency and with an acceleration level of 1 g (9.81 m/s2), such a piezoelectric generator can produce RMS output voltage of 5.20 V.

A railway vehicle can include a sensor node 14 configured to monitor an open/closed state of, for example, a hatch cover. In this case, the hatch cover sensor node can utilize electricity generated from a solar cell. Furthermore, the hatch cover sensor node can use an electricity storage mechanism such as a super capacitor, high performance long life lithium polymer, or other storage device, to store the power. In addition, the sensor node can be configured to only be enabled by movement of the hatch cover, e.g., via an electromagnetic reed switch or a tilt sensor mounted on the hatch cover itself.

While the sensor nodes and corresponding sensed data described herein may be utilized in conjunction with freight railway vehicles, it is understood that these are only illustrative of various sensor node configurations and data that can be implemented. Other types of sensing devices include acoustic sensors, shock sensors, proximity sensors, etc. Each sensing device can be implemented in a manner that does not use external power. Rather the sensing device can be power generating when the corresponding signal is produced. As discussed herein, the sensor node can use very little power for signal processing and/or use other methods to optimize power consumption in communication.

In another embodiment, a vehicle node 12 and/or sensor node 14 can be configured to be recharged via a recharging solution that does not require physical connection between the node 12, 14 and a power source. Illustrative recharging solutions include recharging via a radio frequency antenna, radio power induction, and/or the like. This recharging can happen on a periodic basis, e.g., when the railway vehicle is positioned over a power recharging source.

In various applications, a sensor node 14 will be restricted in size and thus in available power. Even if the sensor node 14 possesses the means to harvest power from some source, availability of the source—vibration, heat differential, or solar—will be variable and limited to one extent or another. For example, a railway vehicle can remain stationary for an extended period of time between uses, which will significantly effect power generation from sources that rely on movement of the railway vehicle.

As a result, an embodiment of a sensor node operates in an intelligent manner to conserve power for actual tasks and to limit total consumption to that which can be replenished by a very pessimistic estimate of available power for harvesting. For example, the pessimistic estimate can be a fraction of the energy expected to be harvested for a relevant time period. The relevant time period and fraction can vary depending on the particular application. For example, for a freight railway vehicle, the relevant time period can be measured over one or more weeks. However, for a transit railway vehicle or a locomotive, the relevant time period can be measured over a week or less. The fraction can be selected, for example, based on an amount of variance anticipated or previously seen in deviances from the expected energy, an importance of preserving sufficient power for one or more tasks that may be or are to be performed, and/or the like. In an embodiment, the fraction can be ½ of the estimate of available power for harvesting for the relevant time period. However, it is understood that this is only illustrative and smaller or higher fractions can be utilized. In general, a higher fraction can be utilized when there is a relatively constant source of available power for harvesting, while a lower fraction (e.g., ¹⁄₁₀ or even less) can be utilized for embodiments with a widely variable source of power for harvesting.

Figure 4:
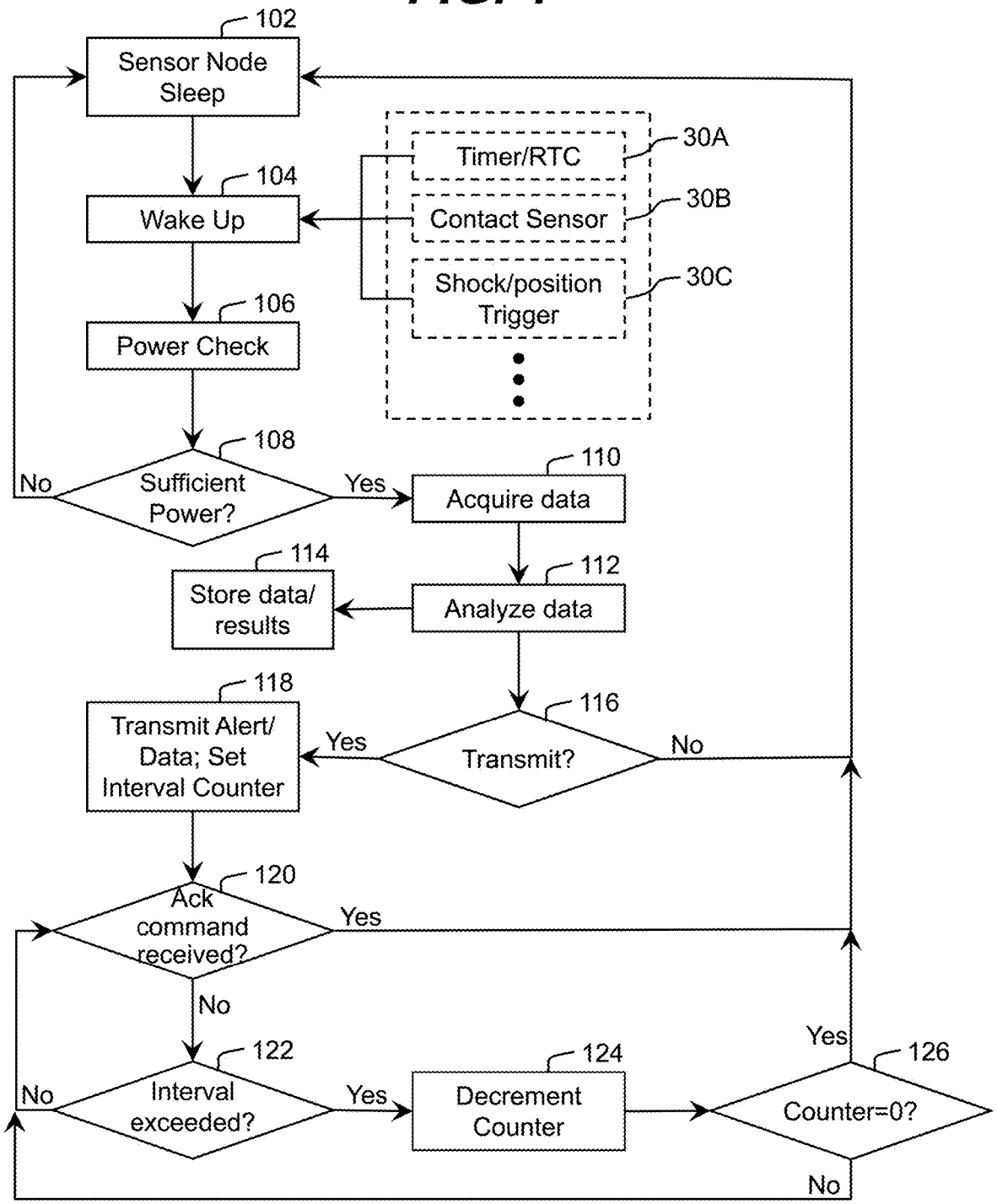
FIG. 4 shows an illustrative process for operation of a sensor node according to an embodiment.

FIG. 4 shows an illustrative process for operation of a sensor node according to an embodiment. In action 102, the sensor node is in a sleep state. In this state, the sensor node uses at least an order of magnitude less power than when operating in an active state. The power can be sufficient only to identify a condition, which results in the sensor node waking up in action 104. The condition can be any of various possible conditions detected by the sensor node. Illustrative conditions include a timer/real-time clock (RTC) 30A providing an indication of expiration of a programmed sleep time period, a contact sensor 30B which makes a physical connection and can be used to "switch on" the sensor node in response to the physical connection changing state, a shock or position trigger 30C which has a component such as a switch that activates the node in response to movement or an acceleration, and/or the like.

A sensor node can wake up over a wide range of time periods. Such time periods can depend on the type of data being acquired and evaluated by the sensor node, whether the railway vehicle is moving or stationary, and/or the like. For a sensor node only triggered on an event, such a time period can be indefinite until such an event occurs. For other sensor nodes, a periodic sampling may be required, at least while the vehicle is moving. For example, a sensor node configured to periodically acquire a spectrum of vibration to determine whether a railway vehicle's behavior is changing, the time period between cycles could be hours long. For a sensor node acquiring temperature data and evaluating the temperature data for abnormal changes, the time period between cycles can be 1-30 seconds. However, for a sensor node acquiring and evaluating strain data (e.g., looking for dangerous peaks), a time period between cycles can be less than a second and acquire a lot more data for each sample as well.

After waking up, in action 106, the sensor node can perform a power check. The power check can evaluate the currently available resources of energy to determine whether the sensor node has sufficient power to perform an entire active cycle (e.g., including transmitting data, if necessary). If not, in action 108, the sensor node can return to sleep and the process can return to action 102 to wait for additional power to be accumulated through harvesting. Otherwise, the process can continue. It is understood that an amount of power required to perform an entire active cycle can vary widely based on the implementation of a particular sensor node. In an embodiment, the sensor node is configured to operate using very little power. In this case, an entire active cycle may require power in the nanoamp-seconds range. However, this is only illustrative, and other embodiments may require power in the milliamp-seconds range or more. When evaluating the power available, embodiments can consider the power required to transmit an alert, if necessary, or exclude such power from consideration of the active cycle power requirements (e.g., when a transmission is only rarely required). In the latter case, sufficient power can be reserved to perform a transmission, if necessary, from the consideration of the power requirements for the active cycle.

It is understood that this process is only illustrative and the sensor node can use a more complex solution, e.g., depending on the power available. For example, as illustrated, an active cycle can include data acquisition, data analysis, and data transmission. The complete active cycle can include one or more stages which may demand a high amount of energy as compared to one or more other stages of the active cycle. For instance, transmission and/or reception of wireless transmissions may demand vastly more power than simple sensor data collection. Similarly, some types of data acquisition can require more power than other types of data acquisition.

To this extent, an embodiment of the sensor node can make one or more adjustments to the active cycle based on the power available. For example, an adjusted active cycle can include: only acquiring some data; only acquiring and analyzing data; transmitting data, but not waiting for a response; transmitting only in response to an operating parameter exceeding an increased threshold; and/or the like. Such a modified active cycle can be implemented, for example, when data acquisition (at least for some of the data) is sufficiently important that it should not be missed.

Regardless, it is understood that the decision of which acts to perform in a modified active cycle and whether to utilize a modified active cycle instead of returning to sleep can be selected based on a particular application of the sensor node according to the power, data, and alarm requirements relating to the sensor node operation. To this extent, it is understood that the sensor node can require a minimum amount of available power not only to complete a single active cycle, but some additional excess power as well. Such a power requirement can utilize a tiered power requirement/processing limiting approach. For example, the sensor node can require a first threshold of power, which is a multiple of the amount of power required to perform a complete active cycle. In response to the available power being lower than the first threshold of power, the sensor node can limit processing during the active cycle, e.g., by returning to the sleep state without waiting for a response from the vehicle node. In response to the available power being lower than a second threshold of power, the sensor node can further limit processing, e.g., by increasing an alert level to trigger a transmission to the vehicle node.

Regardless, when sufficient power is available, the sensor node can perform a complete active cycle. In action 110, the sensor node can acquire data from one or more sensors/sensing devices. Additionally, in action 112, the sensor node can analyze the data. The data analysis performed by the sensor node may vary widely depending on a particular application and/or the power available for computation on the sensor node. Such analysis can include one or more of: filtering to remove spurious noise, specific high, low, or band pass filtering to remove known interference signals (for instance, the regular noise of wheel flats); averaging; pattern matching; Cepstrum analysis to extract signals of generally expected characteristics; and any other analysis appropriate for detecting target signals or conditions and for the available power and computational resources. In action 114, the sensor node can store the raw data received from the sensor(s) and/or the results of the data analysis in an onboard storage. As data storage devices are increasingly less expensive and smaller, a sensor node may be able to store a complete data history of operation throughout a multi-year operational lifetime (e.g., ten years or more).

In action 116, the sensor node can determine whether the analysis requires a transmission to the vehicle node. For example, the sensor node can transmit a message to the vehicle node in response to the analysis indicating an alert condition. Such an alert condition can be determined using thresholding (e.g., outside of an acceptable range of values), a binary state sensor (e.g., switching of states at an unexpected time), and/or the like. Illustrative operating parameters can include vibration detected above a predetermined threshold, a door sensor indicating a door is opened when the railway vehicle is not within a rail yard, and/or the like. Additionally, an alert condition can be determined based on a more complex analysis performed at the sensor node. For example, a sensor node may detect a wheelset having a hunting waveform that exceeds a predetermined set of parameters. Still further, a sensor node can generate an alert in response to the processing indicating that one or more sensing devices is malfunctioning.

When the sensor node does not need to make a transmission or the sensor node does not include sufficient power to make a transmission, the process can return to action 102, where the sensor node can return to sleep. When a transmission is required, in action 118, the sensor node can communicate with the vehicle node using a methodology that conserves power. The sensor node can transmit, for example, an alert and/or data for processing by the corresponding vehicle node. The sensor node can wait to receive an acknowledgement command from the vehicle node indicating that the transmission was received. The acknowledgement command can comprise, for example, a command that the sensor node return to sleep.

In an embodiment, the sensor node waits for the command for only a fixed amount of time before returning to sleep. To this extent, in action 118, the sensor node can set an interval counter indicating a number of intervals (e.g., seconds) to wait to receive the command. The number of intervals can be preset, e.g., by a manufacturer, by an end user, and/or the like. In an embodiment, the sensor node can adjust the number of intervals, e.g., based on an amount of power available. For example, when the sensor node has sufficient power, the sensor node can set the number of intervals to a preset value. However, when the sensor node is low on power, the sensor node can use a lower number of intervals (including zero) before returning to sleep regardless of whether the command has been received from the vehicle node.

In action 120, the sensor node can listen for an interval for the acknowledgement command. In response to receiving the acknowledgement command, the sensor node can go to sleep and the process can return to action 102. Otherwise, in action 122, the sensor node can check to determine whether the interval has been exceeded. If so, in action 124, the sensor node can decrement the interval counter. In action 126, the sensor node can determine whether all intervals have passed, if not, the process returns to action 120 and the sensor node continues to wait for the acknowledgement command. If all of the intervals have passed, the sensor node can go to sleep and the process can return to action 102.

In this process, it is possible for the sensor node to go to sleep without knowing if its transmission was successfully received by the vehicle node. However, as discussed herein, the sensor node can store data and processing results in onboard data storage. In this case, the sensor node can keep the data and processing results at least until an explicit confirmation of transmission has been received from the vehicle node. For example, the sensor node can retransmit the data and/or request confirmation during a subsequent active cycle when sufficient power is available. Alternatively, the vehicle node can request retransmission, e.g., in response to receiving a subsequently sent message. The vehicle node can determine that one or more messages are missing using any solution. For example, a message can include data that enables the vehicle node to determine that one or more messages were not received. To this extent, a message can include a counter field, which corresponds to a message number that is incremented each time the sensor node transmits a message for processing by the vehicle node.

By not waiting an extended period of time to receive the acknowledgement command, and not retransmitting the message when the acknowledgement command is not received after a period of time, the sensor node can conserve power, thereby allowing for an extended operating life. Due to the way in which wireless transceivers function, listening (receiving) wireless signals requires roughly the same amount of power as transmitting them. Additionally, these power demands are usually by far the largest power consumption factor in wireless sensors. For example, it is not uncommon for even low-power wireless transmission to require 10 milliwatts or more of input power, while sensor data acquisition may be on the order of tens of microwatts, or even less. Thus, to keep the sensor node power consumption sufficient for years of service, the amount of time devoted to listening for acknowledgement commands can be balanced against the expected harvest power.

As described herein, the sensor node(s) on a railway vehicle all transmit to a vehicle node also located on the railway vehicle. The vehicle node can be physically larger and located in a position to allow sufficient power harvesting (e.g., solar power) to constantly keep the vehicle node in an at least partially active state. This is a reasonable goal in a wireless network for railroad operations, which can support top-mounted vehicle nodes (or at least a power harvesting component thereof) of a foot or two in extent very easily. Other settings for wireless operation, such as aircraft, often have much higher premiums placed on both size and mass of monitoring systems.

Figure 5:
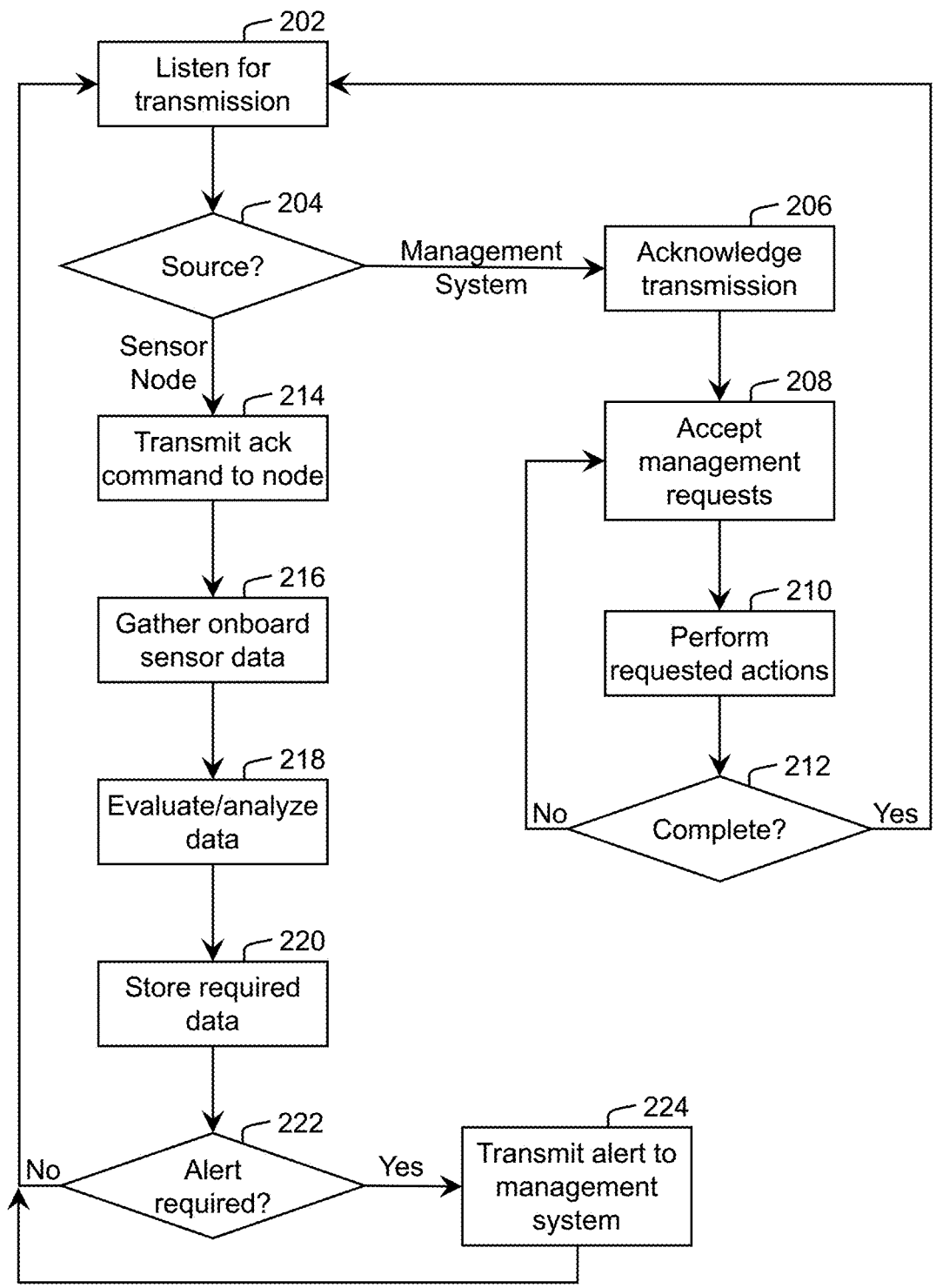
FIG. 5 shows an illustrative process for operation of a vehicle node according to an embodiment.

FIG. 5 shows an illustrative process for operation of a vehicle node according to an embodiment. In action 202, the vehicle node listens for transmissions from sensor node(s). Additionally, the vehicle node can process transmissions received from other types of sources, such as a management system. As discussed herein, the transmissions can be sent using multiple distinct wireless transmission solutions. For example, the sensor nodes can utilize a short range wireless transmission solution while transmissions from other sources can use a medium or long range wireless transmission solution (e.g., cell tower, satellite, and/or the like).

When a transmission intended for the vehicle node is received, in action 204, the vehicle node can identify the source of the transmission. Subsequently, the processing for the transmission can differ based on the source. For a source, such as a management system or another vehicle node, other than a sensor node, in action 206, the vehicle node can acknowledge receipt of the transmission. In action 208, the vehicle node will review and accept any authorized requests included in the transmission, and in action 210, the vehicle node will perform each authorized requested action. In action 212, the vehicle node can determine whether any additional actions need to be performed. If so, the process can return to action 208, otherwise the process can return to action 202, and the vehicle node can wait to receive another transmission.

When the transmission is received from a sensor node located on the same railway vehicle, in action 214, the vehicle node can transmit an acknowledgement command directing the sensor node to return to sleep. In addition to instructing the sensor node to return to sleep, the vehicle node can include one or more additional directives for the sensor node. Such directives can include directing the sensor node regarding a condition under which the sensor node should reawake, instructing the sensor node regarding a condition in which the sensor node should transmit another alert, instructing the sensor node to retransmit a message, instructing the sensor node to halt transmissions (e.g., in the case where the sensor node is apparently malfunctioning), and/or the like. In action 216, the vehicle node can gather additional sensor data available onboard the vehicle node. Such data can include one or more of: data acquired from one or more sensors of the vehicle node, such as heat, vibration, pressure, GPS information, and/or the like; data stored in onboard data storage, such as previous sensor data, data from another sensor, and/or the like; data from one or more external sources of data, such as information regarding the railway vehicle and/or its cargo from a railroad information system; etc.

After acquiring all necessary data, in action 218, the vehicle node can evaluate and/or analyze the data. Evaluation of the data can include extraction of the nature of an alert received from the sensor node. Analysis of the data by the vehicle node can utilize any appropriate combination of one or more analysis methodologies suitable for the corresponding data. As the vehicle node can be considerably more computationally capable than the sensor nodes as well as include additional data not available to the sensor nodes, the corresponding evaluation and analysis can be more complex than that performed on the sensor nodes.

In action 220, the vehicle node can store any required data. Such data can include the data received from the sensor node, some or all of the additional data acquired by the vehicle node, one or more results of the evaluation and/or analysis of the data, timestamp information, location information, information regarding the operating status of the rail vehicle (e.g., speed), and/or the like. In action 222, the vehicle node can determine whether an alert should be transmitted to the management system. If so, in action 224, the vehicle node can transmit the alert to the management system. Such transmission can include, if necessary, retransmitting the alert when an acknowledgement is not timely received, selecting an alternative destination for the transmission, and/or the like. The vehicle node can take differing actions to ensure that the transmission is received based on an importance of the alert. Regardless, the vehicle node can return to action 202 to listen for a subsequent transmission.

Figure 6:
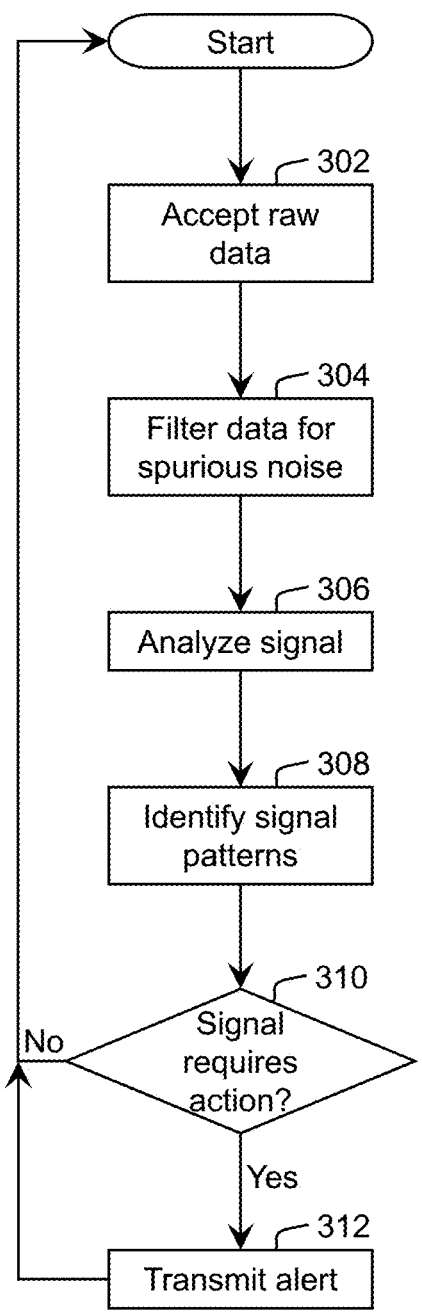
FIG. 6 shows an illustrative process for evaluating signal data according to an embodiment.

Embodiments of the vehicle node and/or sensor node described herein can perform signal processing extract information regarding one or more operating parameters of the railway vehicle, which can be used to identify one or more types of alert conditions. FIG. 6 shows an illustrative process for evaluating signal data, which can be implemented on a vehicle node and/or one or more sensor nodes, according to an embodiment.

In action 302, the node accepts raw signal data to be processed. For a sensor node, such data can include data provided by a corresponding sensing device. For a vehicle node, it is understood that raw data can include data already processed by a sensor node prior to being transmitted to the vehicle node for further processing. In action 304, the node can filter the data to remove spurious noise therefrom. The filtering can include one or more of: literal filtering (e.g., band pass, low-pass, high-pass, etc.); other processing to remove random noise (e.g., averaging when the sample rate is sufficiently high, which can remove significant amounts of spurious random noise without obscuring the signals of interest); and/or the like.

In action 306, the node can analyze the signal data. As described herein, such analysis can include any combination of one or more suitable approaches for extracting target signals from complex data. Illustrative approaches include: averaging, thresholding, filtering, Kalman filtering, Fourier transforms, Cepstrum analysis, and/or the like. When the target signals have been extracted, in action 308, the node can identify any patterns present within the target signals. The node can attempt to identify one or more patterns indicating normal operation, one or more patterns indicating abnormal but harmless operation, and/or one or more patterns indicating a potential problem in the operation.

In action 310, the node can determine whether any further action is required based on the presence or absence of one or more patterns in the target signals. If action is required, in action 312, the node can transmit a corresponding alert. For the sensor node, the alert can be transmitted for processing by the vehicle node. For the vehicle node, the alert can be transmitted for processing by a management system, which can be included in or separate from a train in which the railway vehicle is traveling.

The signal processing described herein can enable a vehicle node 12 (FIG. 2A) or a sensor node 14 (FIG. 2B) to identify one or more conditions or operating parameters not readily identifiable in previous approaches. Embodiments of the vehicle node 12 and a set of sensor nodes 14 improve on prior monitoring solutions by determining when a high priority event, which poses a significant risk for damage and loss, has occurred or may be about to occur. For example, one type of high priority event is derailment of a railway vehicle. Whether a given risk is significant can vary based on the corresponding potential damage. To this extent, for a sufficiently high potential damage amount, even a relatively small risk (e.g., one percent) may be deemed a significant risk. Regardless, it is understood that an acceptable risk is highly application-dependent.

Figure 7:
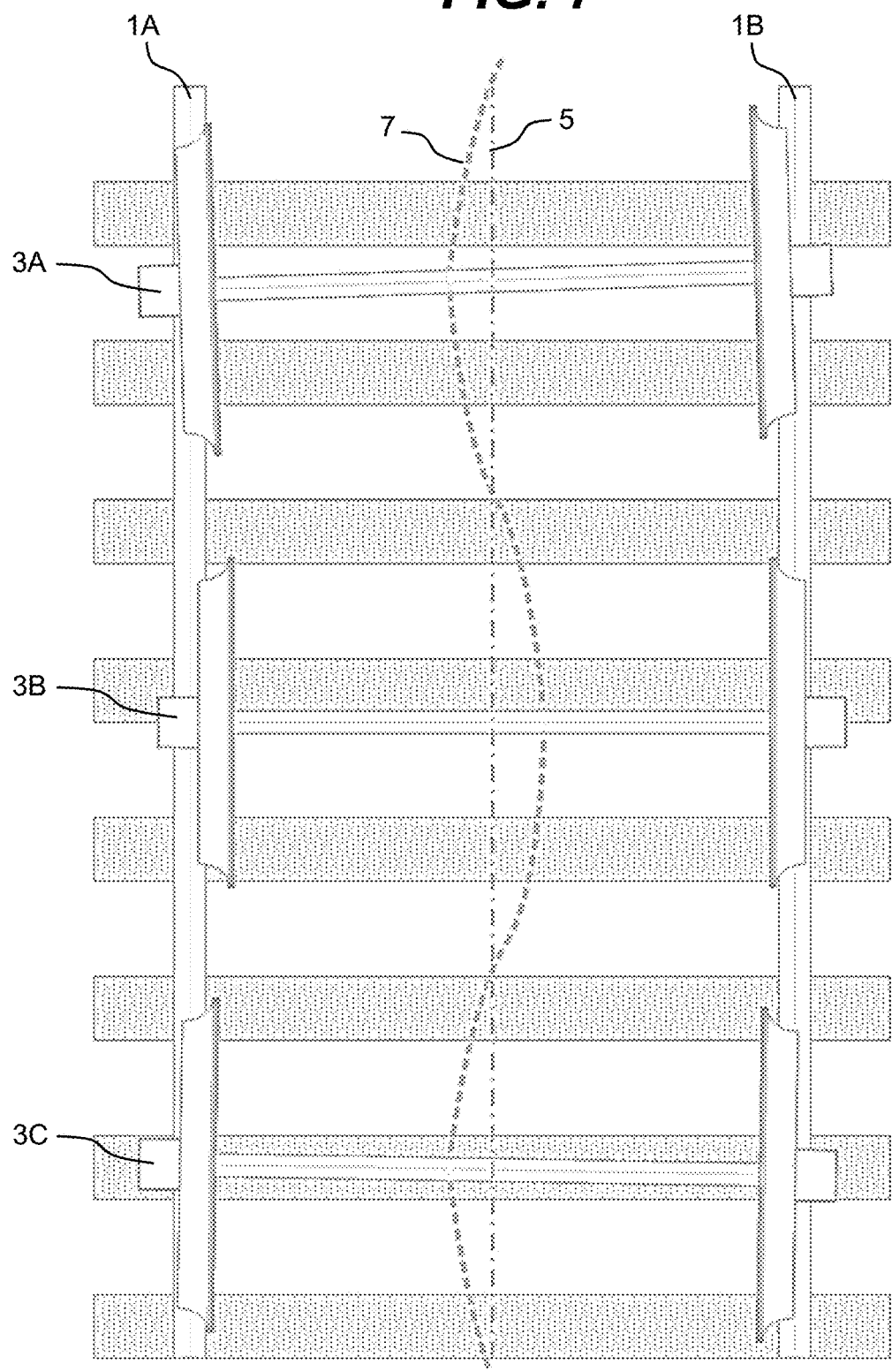
FIG. 7 provides an illustration of hunting.

Derailment is frequently caused by a worn wheel climbing over the rail. A worn wheel can be caused by a number of factors. Regardless, an indication of wheel wear can be determined by analyzing an amount of hunting performed by a given wheelset. FIG. 7 provides an illustration of hunting. In particular, a pair of rails 1A, 1B are shown affixed to railroad ties or sleepers as is common in the art. A wheelset of a railway vehicle is shown at three locations 3A-3C as it travels along the rails 1A, 1B. The wheelset includes an axle with a pair of wheels permanently affixed thereto. The remainder of a wheel truck of a railway vehicle rids on the wheelset through the use of bearings located on the outer side of the wheels.

Under normal conditions, the wheelset travels along the rails 1A, 1B in a substantially straight line, maintaining a centerline alignment of the wheelset with a centerline 5 of the rails 1A, 1B. However, when the wheels on the wheelset are sufficiently worn, the wheelset can turn slightly (e.g., on a large circular bearing which is a part of the typical wheel truck). When this happens, the wheels attempt to climb a rail 1A, 1B, but are turned back by the wheel flange contacting the rail 1A, 1B. This force turns the wheelset in the opposite direction, where it will attempt to climb the other rail 1A, 1B before being turned back by the wheel flange contacting the other rail 1A, 1B. This process continually repeats as the wheelset travels along the rails 1A, 1B and produces a fairly regular oscillation back and forth between the rails 1A, 1B of the wheelset centerline 7. It is understood that the oscillating wheelset centerline 7 is an exaggerated waveform used to illustrate the hunting behavior.

The oscillations will increase in severity under a number of conditions. For example, as wear on a rail wheel increases, the oscillations can increase. Additionally, the oscillations may fall into a resonance state. Regardless, when an oscillation becomes sufficiently strong and/or a wheel (e.g., the flange) is sufficiently worn, the wheel can travel over (jump) the rail 1A, 1B, triggering a derailment. However, even in isolation, detection of dangerous oscillations is not readily performed using thresholding of, for example, acceleration, since the specific acceleration of the car from side to side will vary significantly depending on the speed of the railway vehicle, the degree to which the wheelset is worn, and therefore how far the wheelset can travel from side to side before encountering a rail 1A, 1B, which causes the wheelset to stop and turn back. Of course, in applications, the signal does not exist in isolation, but is one of a number of signals, many of which also can produce a shock that could exceed a given threshold. For example, a wheel flat (caused usually by heavy braking that wears away a portion of the wheel tread) can cause very strong shocks transmitted throughout the railway vehicle, depending on a size of the flat.

The signal processing described herein can extract and identify a signal relating to a rail truck hunting. For example, a node can distinguish the long periodic hunting signal corresponding to the oscillating wheelset centerline 7 from other periodic and non-periodic signals generated during operation of a railway vehicle using one or more solutions. One frequently present signal is a periodic signal generated due to a wheel flat. In this case, the wheel flat signal and the hunting signal are distinguishable using at least two distinguishing features. A first feature is the corresponding waveform shape of the respective signals. In particular, the waveform shape generated by a wheel flat and acquired by an accelerometer present on the railway vehicle will be a series of very sharply defined peaks occurring at intervals directly related to the speed at which the railway vehicle is traveling. In contrast, the hunting signal acquired by an accelerometer present on the railway vehicle is a cyclical curve, which can have increasingly high peaks at the inflection points, with a wavelength on the order of tens of feet (i.e., three or more meters). Additionally, a wheel flat signal can be distinguished from a hunting signs by the respective frequencies. In particular, the wheel flat signal is generated each revolution of the rail wheel, whereas hunting occurs over several revolutions of the wheels. It is understood that these are only illustrative approaches for distinguishing signal data generated by distinct sources, and other approaches can be utilized.

Another approach, which can be used, for example, to distinguish between a flat spot signal and a hunting signal, is analysis of the dominant acceleration axis. In particular, dominant vertical acceleration is generally attributable to flat spots, while dominant lateral (along a track tie axis) acceleration is generally attributable to hunting. In other words, flat spots do not produce significant lateral acceleration signals and hunting does not produce significant vertical acceleration signals. Yet another signal processing technique involves analysis of the actual frequency of the acceleration to differentiate between possible causes. Considering again differentiation between flat spot and hunting signals, a flat spot will produce a periodic signal corresponding to each wheel revolution which is directly related to the train speed. For a railway vehicle moving at 40 miles per hour (65 kilometers per hour), a 36 inch (0.9 meter) diameter wheel will produce an approximately 6 Hz signal, which will remain with the railway vehicle throughout its route corresponding to its speed. In contrast, the hunting signals will appear or disappear at different parts of the track and will have a characteristic frequency corresponding to the vehicle dynamics.

In yet another signal processing approach based on statistical comparisons, the system (e.g., a sensor node, vehicle node, and/or management system) can compare acceleration signals, both vertical and lateral, across different train wheels, across different wheels in the same railway vehicle, and left and right wheel on the same axle. In addition, the statistical comparisons can utilize a wide range of statistical data processing to normalize the data, analyze the data, or perform other statistical signal processing before applying axles-based, vehicle-based, and/or train-based data comparison rules.

Figure 8A:
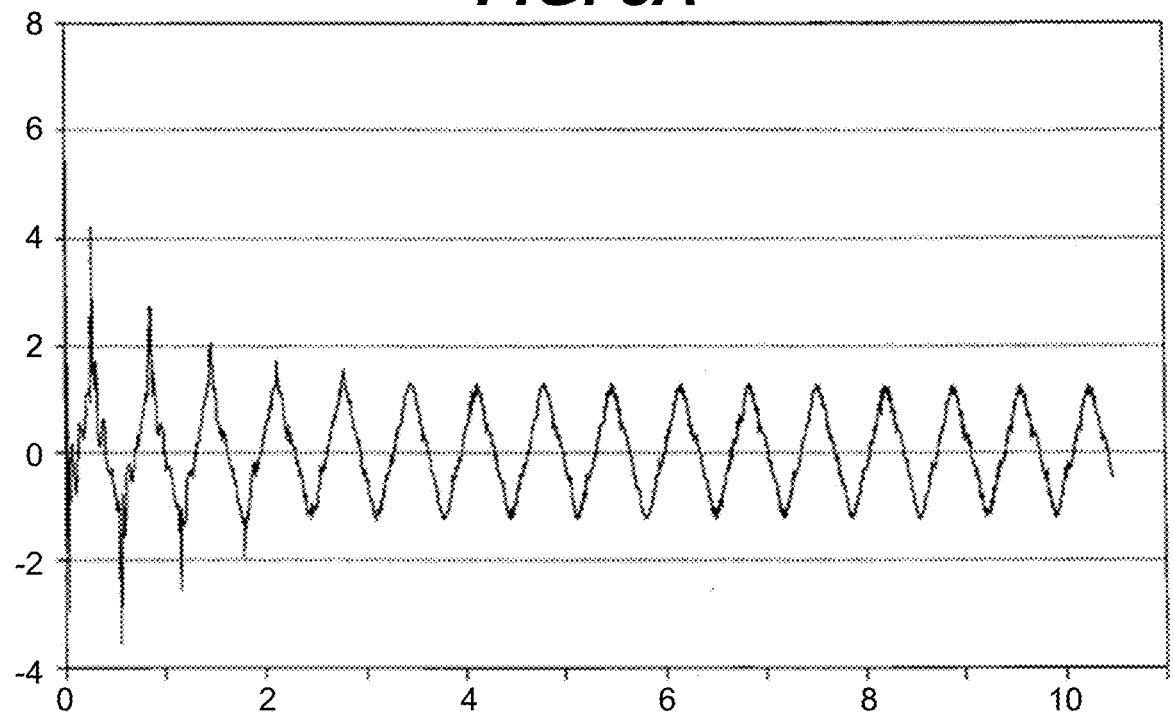
FIGS. 8A and 8B show graphs of signals illustrating normal damping behavior of a railway vehicle and hunting behavior of a railway vehicle, respectively.
Figure 8B:
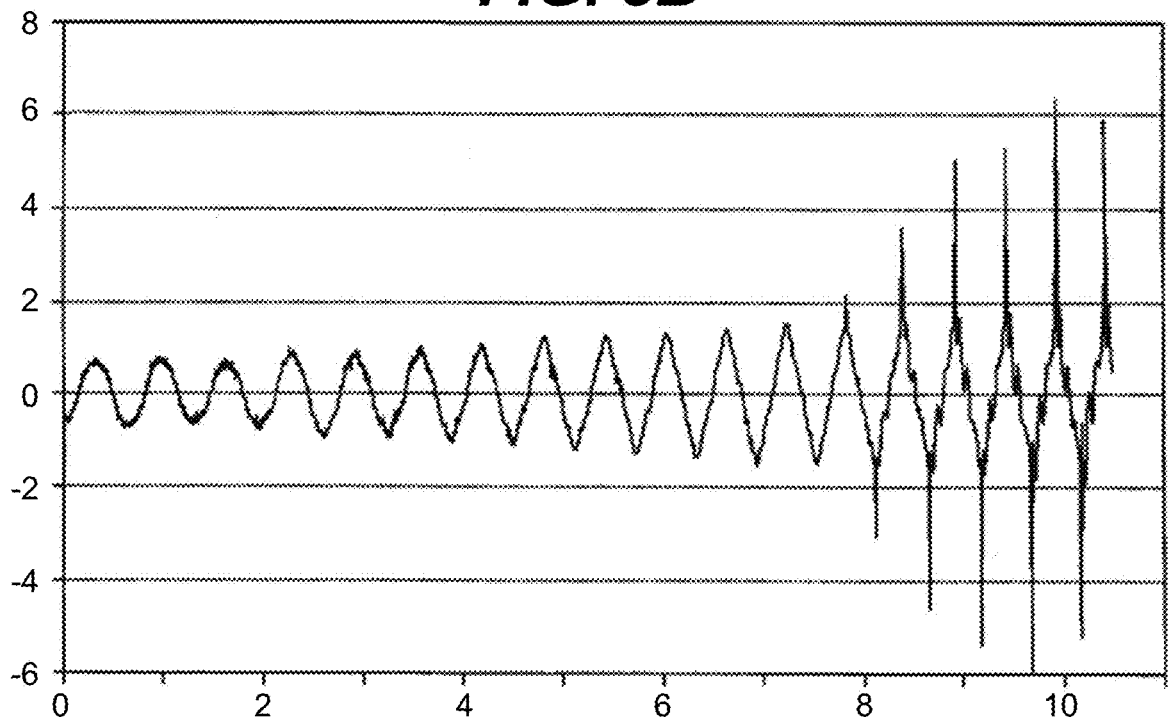

During operation, a railway vehicle may be subjected to a force, which causes oscillations of the railway vehicle. Such forces can be generated due to any of several types of a wheel or track defect. In an embodiment, a node described herein can distinguish such oscillations of the railway vehicle from hunting by analyzing the peak amplitudes of the oscillating signal over time. For example, FIGS. 8A and 8B show graphs of signals illustrating normal damping behavior of a railway vehicle and hunting behavior of a railway vehicle, respectively. As illustrated in FIG. 8A, an impulse shortly after time 0 (in seconds) causes an amplitude of the oscillation of the railway vehicle to exceed 4 times the acceleration of gravity (g). However, the peak amplitude of the signal quickly drops, and by ten seconds the peak signal has returned to a low, constant base value.

In contrast, in FIG. 8B, a low, constant base value early in the graph begins to increase without any indication of an impulse causing the increase. By approximately ten seconds, the oscillations have become violent impacts, well in excess of four times the acceleration of gravity (g) and reaching 6 g in each direction. This level of hunting presents a significant danger of causing derailment. By analyzing a pattern of the peaks over time, a node described herein can generate an alert relatively early in the hunting at a lower acceleration threshold (e.g., upon the oscillations exceeding 2 g or even less), without triggering false alerts due to an impulse causing the acceleration to temporarily exceed the lower acceleration threshold.

Additional analysis can be applied to the hunting signal to determine whether it requires action. A very large number of wheelsets hunt to some extent, but only when the hunting behavior passes a certain level does it begin to pose a threat of damage or derailment. An embodiment of a node described herein determines whether hunting behavior poses a threat by first extracting the hunting signature, and then comparing the peak accelerations seen at the points where the hunting truck is "turned back" by the rail. Peak accelerations of the hunting signature that have increased from previous levels and/or are beyond some predetermined level would indicate a railway vehicle in danger of derailment. Other methods of analysis are possible and can be implemented in embodiments described herein.

Figure 9:
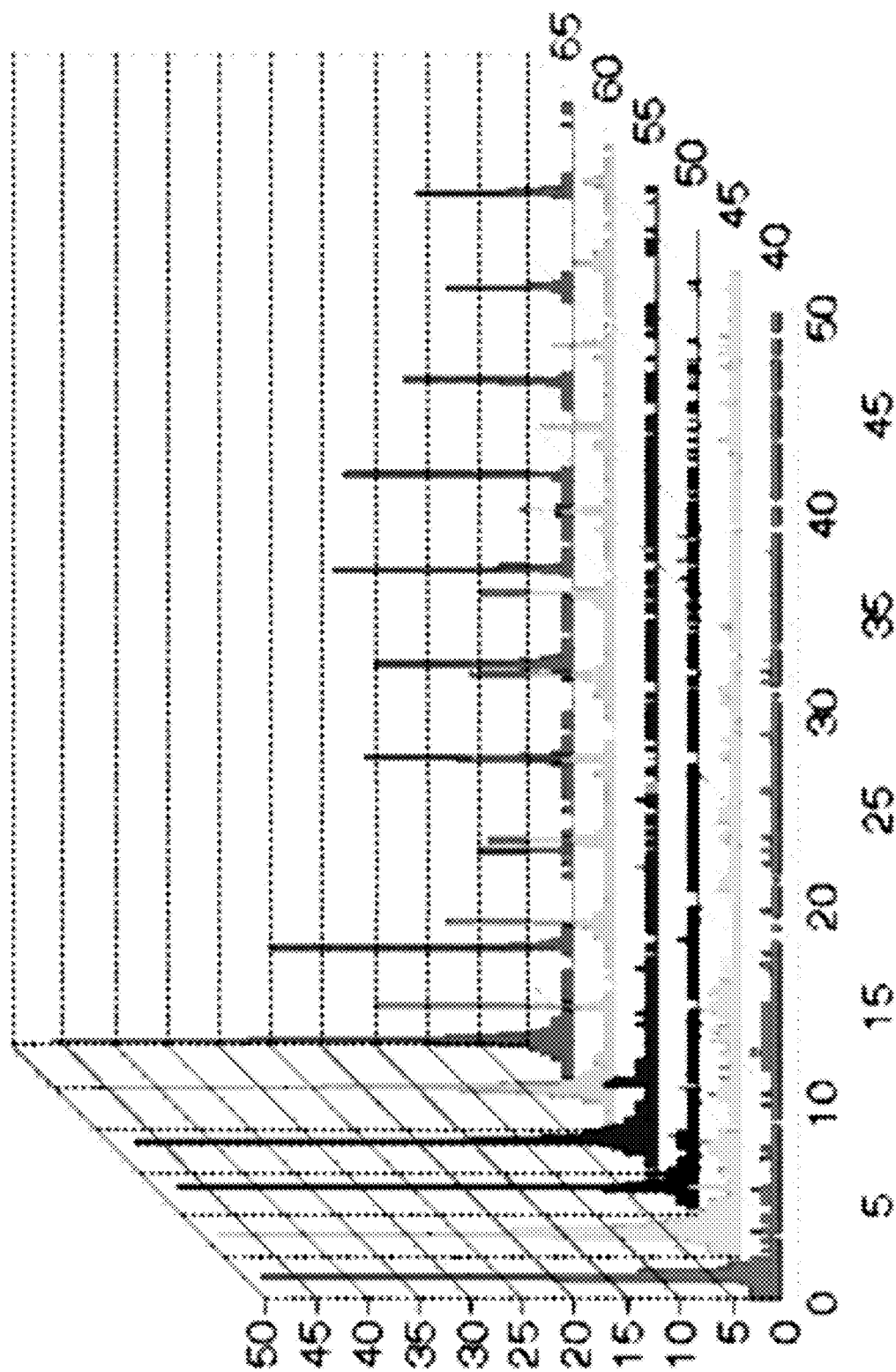
FIG. 9 shows a three dimensional graph of six runs of a hunting railway vehicle, each at a different speed, according to an embodiment.

In addition to the levels of acceleration seen over time, a frequency of the accelerations can be of interest in evaluating a hunting railway vehicle. FIG. 9 shows a three dimensional graph of six runs of a hunting railway vehicle, each at a different speed, according to an embodiment. The graph illustrates the signals as an overall amplitude (y direction) versus frequency (x direction), with the corresponding vehicle speed shown along the depth of the graph (z direction). As a result, the graph provides an overview of any frequency peaks in the signal across a variety of speeds. The railway vehicle was traveling at speeds of 40, 45, 50, 55, 60, and 65 miles per hour (65 to 105 kilometers per hour) during the six runs. As illustrated, each run includes a significant peak at approximately two hertz. While some runs include peaks at higher frequencies, particularly the higher speed runs, only the initial peak at approximately two hertz is present in all of the runs. Furthermore, the initial peak is the most pronounced peak of all the peaks present in any of the runs and does not shift with speed.

An embodiment of a node described herein uses the presence of a significant peak at approximately two hertz to detect hunting by a truck of a corresponding railway vehicle. Such an approach for identifying hunting can lead to far fewer false positives than current approaches, which alarm only on acceleration level.

Figure 10A:
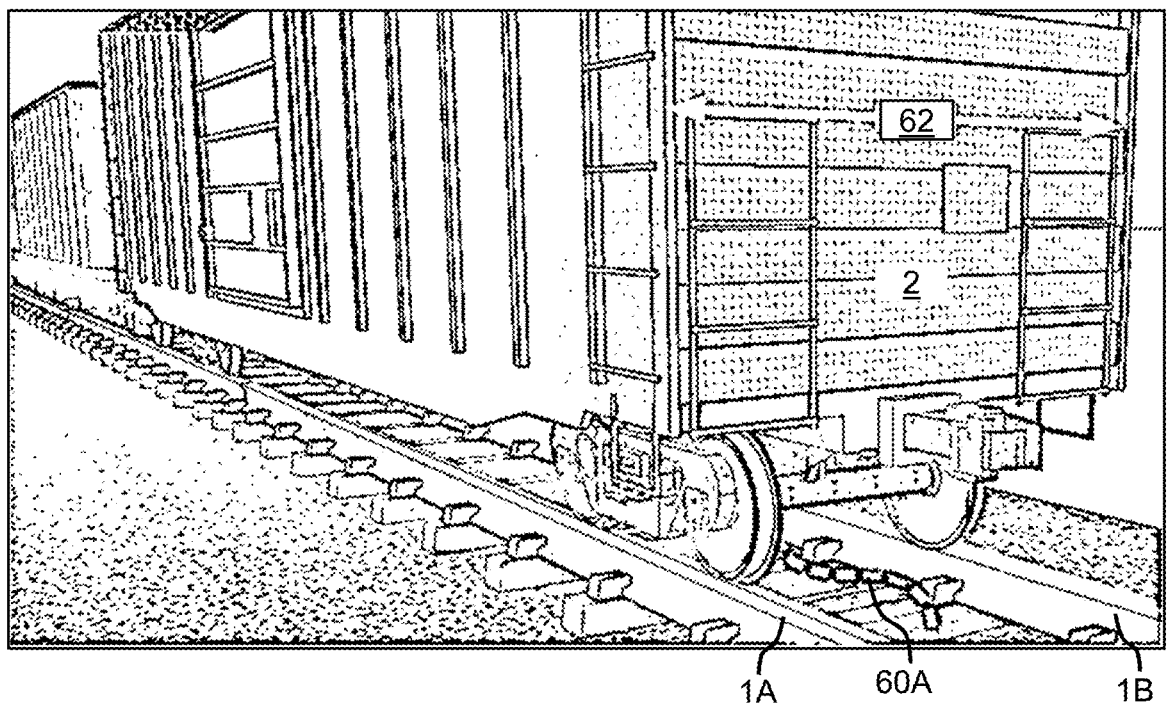
FIGS. 10A and 10B show an illustrative railway vehicle hunting and after derailment, respectively, as it travels along tracks according to an embodiment.
Figure 10B:
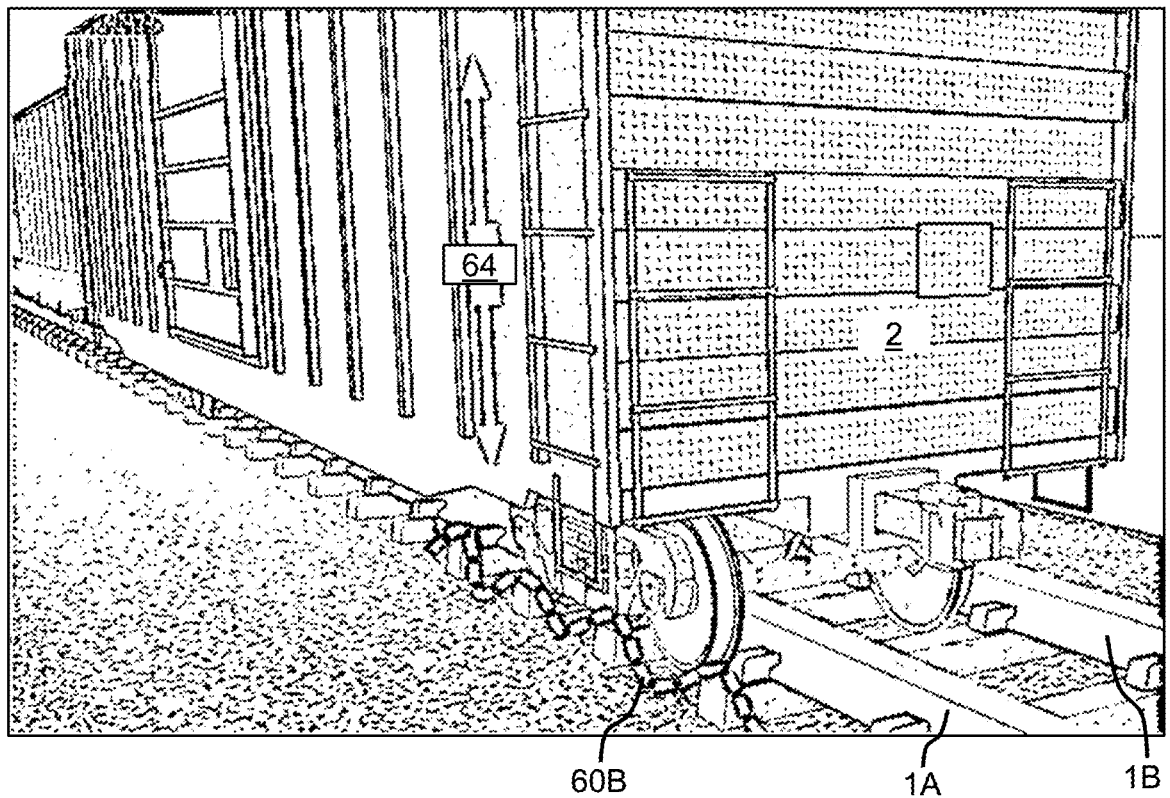

An embodiment of a node described herein also can distinguish signal signatures due to a derailment or other source from hunting as well as a transition from hunting to derailment. For example, FIGS. 10A and 10B show an illustrative railway vehicle hunting and after derailment, respectively, as it travels along tracks according to an embodiment. As illustrated in FIG. 10A, the hunting railway vehicle 2 causes oscillations 60A back and forth between the rails 1A, 1B. These oscillations 60A cause impacts substantially along a horizontal axis 62 that passes through the railway vehicle 2 from side to side. In contrast, after derailment as shown in FIG. 10B, wheels of the railway vehicle 2 run outside of or between the rails. This causes the wheels to alternately sink into ballast and ride up over ties. This wheel motion causes an up and down oscillation 60B. These oscillations 60B cause impacts substantially along a vertical axis 64 that passes from the top to bottom of the railway vehicle 2.

An embodiment of a sensor node can detect both types of oscillations and distinguish between the directions of the oscillations. Additionally, an embodiment of a vehicle node can receive signal data from multiple sensor nodes, one of which acquires data corresponding to horizontally oriented oscillations and the other of which acquires data corresponding to vertically oriented oscillations. The vehicle node can process data received from both sensor nodes to determine the source of the oscillations and/or a transition from one type of oscillation to another.

By considering a combination of signature and orientation of acceleration, a node described herein also can differentiate track-defect signals from hunting detection. Track defects almost exclusively cause vertical impact signatures, which are quite distinct from the derailment signature shown in FIG. 10B. It is understood that the evaluation and processing described herein can be applied to other sensing modalities, which can enable a node described herein to reliably identify other faults. For example, a sensor node acquiring infrared data can detect heat buildup in bearings, which may indicate worn or damaged bearings. In this embodiment, a vehicle node can process data acquired from multiple sensor nodes present on a railway vehicle, each of which monitors a different set of bearings, to determine whether the heat signature of a set of bearings is abnormal and potentially indicative of a problem. Furthermore, a sensor node described herein can acquire acoustic data, which the sensor node and/or vehicle node can process to detect bearing issues or signatures of other types of faults which may not be readily detectable using the broad vibrational regime.

With a monitoring approach described herein, it is understood that embodiments of a vehicle node and/or sensor node described herein can extract and identify other railroad-related issues, in addition to or alternative to hunting and derailment, using a monitoring solution described herein. For example, these issues include flat spots, out-of-round wheels, broken wheels, bent axles, defective springs, and/or the like, each of which produces a vibratory or acceleration effect. By noting characteristic frequency signatures of the signals and variations in orientation as described herein, a node described herein can individually detect and reliably discriminate between a broad variety of such faults. As a result, the corresponding system can have a low false-positive and low false-negative detections of these conditions. Furthermore, such detections can be well in advance of any actual danger, allowing the railroad to act to prevent any damage in a cost-effective manner.

Embodiments of a monitoring system described herein can utilize a signal processing approach to perform analysis of signal data acquired by sensor devices located apart from railway vehicles. For example, as shown in FIG. 1, a trackside sensor node 16 can be located on or adjacent to a section of rail over which railway vehicles 2 travel, and can acquire data for evaluating one or more operating parameters as the railway vehicles 2 move past. The trackside sensor node 16 can communicate with a vehicle node 12 for a corresponding railway vehicle 2 or communicate with a management system 18 described herein. As the trackside sensor node 16 deployed near a track may have access to additional, more reliable power (e.g., solar power) than the sensor nodes 14A-14D located on the railway vehicle 2, the trackside sensor node 16 can use a higher power wireless communications solution to communicate with the vehicle nodes 12 and/or management system 18.

Figure 11:
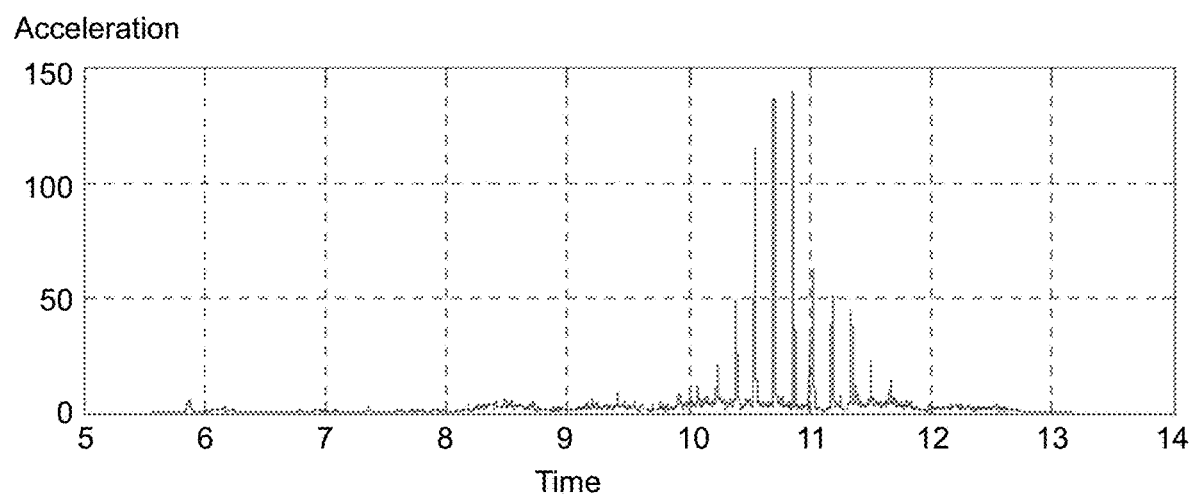
FIG. 11 shows a signal graph of acceleration versus time, which can be acquired by a trackside sensor node according to an embodiment.

Regardless, FIG. 11 shows a signal graph of acceleration versus time, which can be acquired by a trackside sensor node 16 (FIG. 1), such as an accelerometer detection device affixed to a rail, according to an embodiment. During normal operation, a low level of acceleration noise may be detected by the trackside sensor node 16 (e.g., as shown in the 6-7 second range of the graph). When a rail wheel in good condition passes over the trackside sensor node 16, a detectable but still small amount of acceleration is detected (e.g., as shown in the 8-10 second range of the graph). However, when a rail wheel with a flat spot passes over the trackside sensor node 16, a series of high accelerations (shown in the 10-12 second range) are detected and readily distinguishable, which are directly related to the rotation of the flat spot to impact with the rail. In response to detecting these accelerations, the trackside sensor node 16 can transmit an alert to the vehicle node 12, management system 18, and/or the like. Such an alert can enable, for example, a railroad entity to prepare in advance to replace the rail wheel with the flat spot.

While FIG. 11 illustrates data acquired by a trackside sensor node 16, similar signals may be detected by a sensor node 14 mounted on the railway vehicle 2. However, in this case, when a flat spot appears, the signals would generate a much more constant amplitude at any given speed and location (as the railway wheel will always be in the same position relative to the sensor node). Additionally, as compared to the hunting signals shown in FIG. 8B, the signals generated by a flat spot are clearly distinguishable. In addition to significantly different frequencies, the wave forms are distinct with even a violently hunting truck showing a cyclic rise and fall with a noticeable build and fall off on each side of the peak, while the flat spot signal is a nearly instantaneous peak with little to no associated rise or fall elsewhere in the signal data. This allows a monitoring system described herein to discriminate between the different flaws and thereby send notifications which are appropriate, e.g., to arrange the service relevant to the specific condition. Similar discrimination can be performed for other conditions.

By being able to detect and distinguish abnormalities early on, a railroad entity can have an opportunity to prevent derailments, bearing fires, or long-term damage due to defects, such as flat spots and hunting, rather than forcing the railroad into a "reactive" mode, cleaning up the damage already done. Current-art systems are most likely to alert only when a disaster has happened or is so close to happening that it will be difficult to prevent. For example, a derailment can be detected using a sensor node including a three-dimensional accelerometer on the railway vehicle. The accelerometer normally will be oriented with a given axis, e.g., with the Y axis, up. If a measurement of acceleration on shows the X or Z axis is more closely vertical than the Y axis, the railway vehicle has clearly tipped over and is thus derailed. However, embodiments of the invention seek to identify a condition potentially leading to derailment, rather than detecting the derailment itself.

Embodiments of a monitoring system described herein can include numerous sensor nodes located in various locations throughout a railway vehicle. Each sensor node can be configured to enter a lower power "sleep" state, which can significantly reduce their power demand, e.g., by orders of magnitude in some embodiments. Each sensor node will need to be able to enter an active state in response to a relevant event. As the types of sensor nodes and corresponding data acquired by the nodes can vary, the event that triggers a sensor node to enter an active state also can vary.

Figure 12A:
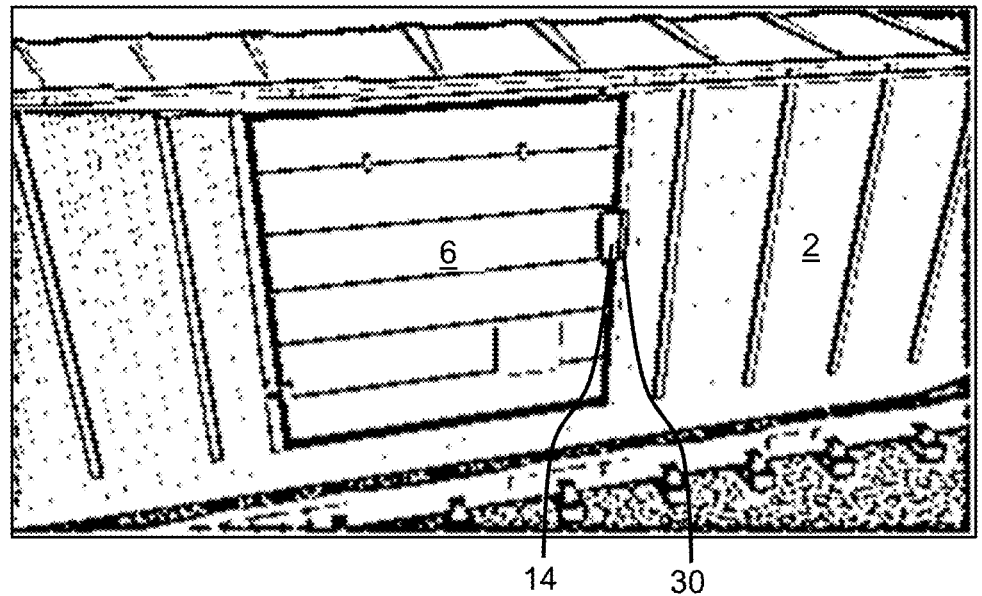
FIGS. 12A-12E illustrate various approaches for triggering a sensor node to enter an active state according to embodiments.
Figure 12B:
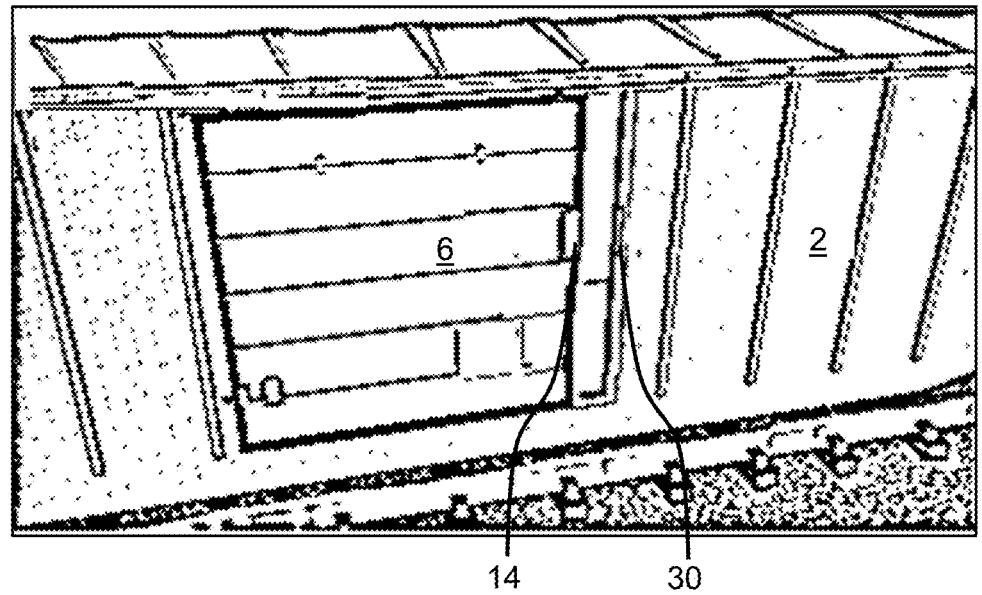

FIGS. 12A-12E illustrate various approaches for triggering a sensor node to enter an active state according to embodiments. In FIG. 12A, a railway vehicle 2 is shown including a door 6. A sensor node 14 can be configured to monitor whether the door is closed or open. To this extent, the railway vehicle 2 can include a switch plate 30, which is configured to be adjacent to the sensor node 14 when the door 6 is closed. When the door opens, as shown in FIG. 12B, the sensor node 14 and switch plate 30 can physically separate. The separation can be used to cause the sensor node 14 to enter an active state using any of various approaches.

For example, the switch plate 30 can comprise a magnet and the sensor node 14 can include a magnetic reed switch. As long as the switch plate 30 is in close proximity to the sensor node 14, the reed switch remains open and the sensor node 14 remains in a sleep, or even off, state. Once the door 6 is opened, the reed switch closes and the sensor node 14 enters an active state. Similarly, the switch plate 30 could be metal and when the door is closed, contacts on the sensor node 14 can form a circuit that keeps the sensor node 14 in a low-power mode. When the door 6 is opened, the circuit is broken and the sensor node 14 can enter an active mode. It is understood that these are only illustrative, and multiple other solutions for sensing the opening of the door 6 can be used to awaken the sensor node 14. It is understood that the act of entering an active state can comprise an alert condition to be sensed (e.g., opening a railway vehicle door).

Figure 12C:
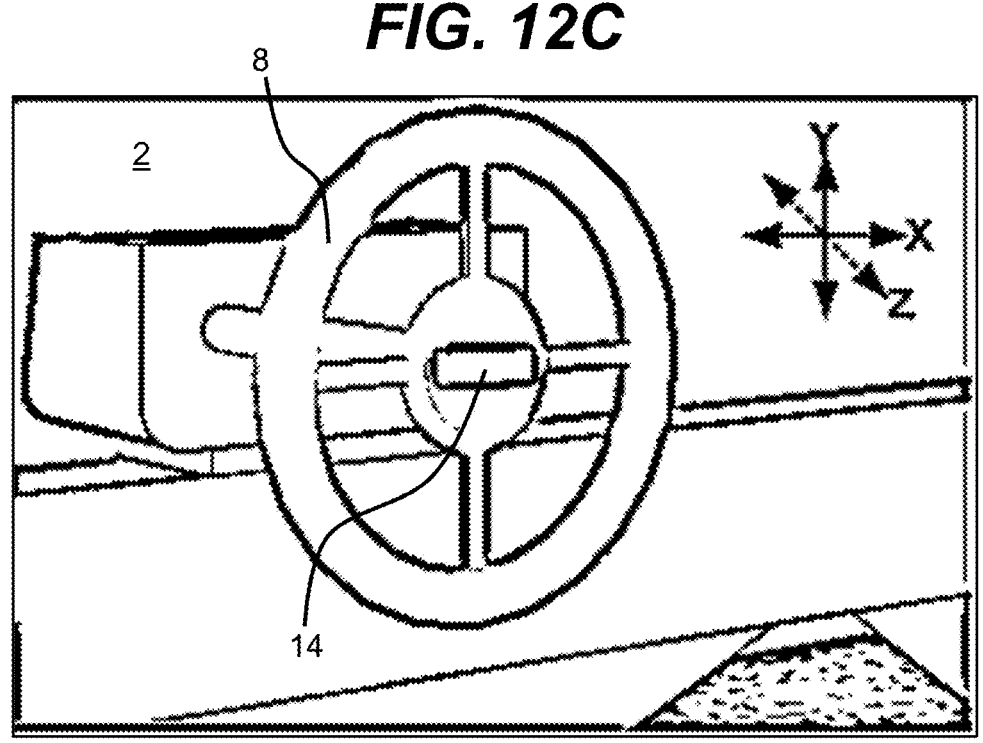
Figure 12D:
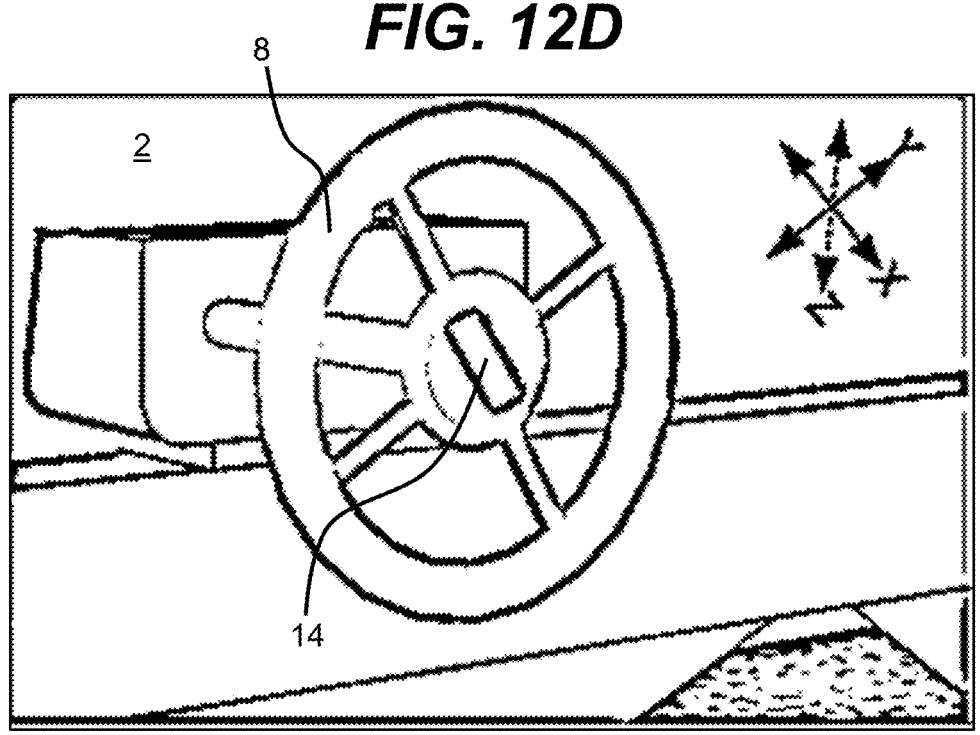

FIG. 12C shows another illustrative sensor node 14, which is mounted on a valve wheel 8, which can be turned to operate a valve located on a railway vehicle 2. For example, the railway vehicle 2 can comprise a railway vehicle configured to carry a liquid cargo. Regardless, the sensor node 14 can acquire data from a three-axis accelerometer. As illustrated in FIG. 12C, when the valve wheel 8 is not being operated, the accelerometer can provide data indicating a first orientation of the measurement axes. In FIG. 12D, the valve wheel 8 has been turned. As a result, the accelerometer has a changed orientation with respect to the exterior world. By sensing this change in orientation, the sensor node 14 can enter an active state for data analysis and/or transmission. It is understood that any of various other solutions (e.g., mercury switches, and/or the like) for triggering the sensor node 14 based on a change in orientation can be utilized.

Figure 12E:
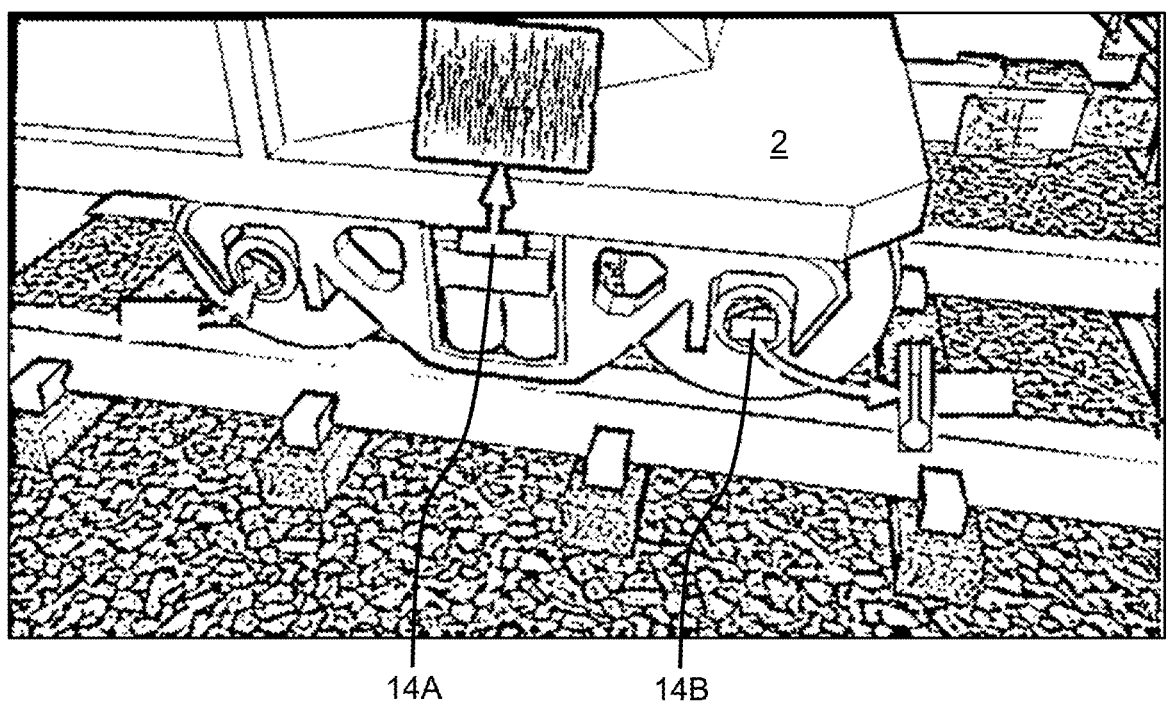

In FIG. 12E, a railway vehicle 2 is shown including a first sensor node 14A, which can be affixed to a support frame for the wheels and can be equipped with an energy harvester for vibrations. When the railway vehicle 2 is stationary, there are no vibrations. However, when the railway vehicle 2 begins to move, the movement causes vibrations that can be harvested by the sensor node 14A into energy, which wakes up the sensor node 14A. Similarly, a sensor node 14B can be mounted to the bearing assembly of a wheel. The sensor node 14B can be equipped with an energy harvester based on temperature differential. In general, a significant temperature differential only exists when the railway vehicle 2 has been moving for some interval. Once a sufficient temperature differential is detected, the energy can be harvested and the sensor node 14B can enter an active mode.

As illustrated, the act of entering the active mode can be an event that causes the sensor node 14A, 14B to communicate with the vehicle node. In this manner, a sensor node 14A, 14B can remain in a sleep/no power state for extended periods of time, only awaking when communication with the vehicle is likely to be necessary. Additionally, the sensor node 14A, 14B also can only awake when there is sufficient power being harvested to operate the sensor node 14A, 14B. It can be seen that many of these approaches, and other similar ones which may be devised by those skilled in the art, may be used both as a wakeup and sensor for a condition of interest. Whether a door is open, a valve turned, a railway vehicle moving, and/or the like, are all important pieces of data. Using these events as both wakeup and data provides an efficient and effective use of the sensor nodes in a system. The hunting signatures discussed herein will not be present when the railway vehicle is not moving. As a result, using a wakeup solution that applies only when the railway vehicle moves conserves energy efficiently.

However, conditional alerting on key conditions may be preferable to alerting on the condition alone. For example, returning to FIGS. 12A and 12B, a railway vehicle's door 6 will be frequently open during loading and unloading operations, and a sensor node 14 alerting on the fact that the door 6 is open will be wasting its energy and potentially that of other nodes or systems in doing so. A far more efficient approach provides an alerting scheme that combines the fact of the door 6 being open with other data, such as GPS location data, or motion or speed measurement, to show that the door 6 has been opened when on a siding rather than in a yard, or while the car is in motion, and thus the opening of the door becomes much more significant. In an embodiment, the vehicle node can use such data to adjust operation of the sensor node 14. For example, the vehicle node can instruct the sensor node not to retransmit in response to a door 6 being opened for a certain period of time, until another event has occurred, such as the rail vehicle 2 has moved, and/or the like.

An embodiment of the sensor node 14 can include multiple sensing devices, which can provide data that is processed by the sensor node 14 upon entering the active state to determine whether to transmit an alert or to ignore the awakening event, such as the door opening event. For example, the sensor node 14 can store a previous GPS location for a last door opening event. Subsequently, when a new door opening event is detected, the sensor node 14 can determine whether the railway vehicle 2 has changed position before transmitting an alert. In this manner, the sensor node 14 only transmits an alert the first time a door 6 is opened at a particular location. Regardless, it is understood that additional data can be utilized, such as a time of day, to determine whether an alert should be transmitted for processing by a vehicle node.

As discussed herein, a vehicle node 12 (FIG. 2A) can combine and process data received from various nodes located on a railway vehicle 2. For example, a sensor node 14 monitoring the door 6 of a railway vehicle 2 may provide an indication that the door 6 was opened. The vehicle node 12 can examine data received from a vibration sensing node or a GPS sensing device to determine whether the railway vehicle 2 is moving. Additionally, the vehicle node 12 can query a management system 18 (FIG. 3) to determine whether the door opening corresponds with a schedule, such as a loading schedule, relating to the railway vehicle 2.

A vehicle node 12 can perform many other similar combinations and analyses to determine a condition of the railway vehicle 2 and, depending on data available from the sensor nodes 14 on the railway vehicle 2, the cargo as well. For example, in the case of an accident, not only can an accelerometer-equipped sensor node (such as described in conjunction with FIGS. 12C and 12D) immediately recognize that the railway vehicle 2 had derailed and fallen over by the orientation of the acceleration of gravity shifting, but also any sensor node(s) equipped with chemical sensors could determine if various cargo of interest was leaking. This data could be provided by the vehicle node 12 to a management system 18 and/or to first responders.

As described herein, communications between the vehicle node 12 and one or more sensor nodes 14 can use a wireless transmission solution. Wireless transmission of data often encounters significant obstacles, such as interference from other signals, multipath issues, and difficulty in transmitting through cluttered environments or environments filled with metal or other materials that can severely attenuate signals. Common wireless systems tend to operate on one of two bands: one around 900 MHz and the other at 2.4 GHz. Both of these bands are minimally restricted and low-power networks may operate freely in them.

However, both bands tend to have short ranges, especially at the low power to which sensor nodes described herein can be restricted in order to provide long-term maintenance free operation. In particular, ranges of transmissions in these bands rarely exceed thirty meters even under very good communication conditions. In conditions likely to be encountered in railroad settings, the ranges may be as little as a tenth of that or even less for 2.4 GHz networks. As railcars average over seventeen meters in length, even the on-board data links from the sensor nodes to the car node require reliable transmission distances of over ten meters. For communications with a management system, a range of at least a hundred meters is desirable.

Lower frequency, longer-wavelength transmissions tend to have far greater ranges for the same transmission power. These transmission tend to penetrate or pass around obstacles more effectively. For this reason, an embodiment of a monitoring system described herein operates using wireless transmissions in a lower regime. At a transmission level of 0 dB (~1 mW radiated power, roughly equivalent to the normal default power in standard wireless sensor network systems), Friis transmission calculations show that a 433-MHz signal may be expected to travel over fourteen hundred meters across free space. Even with a greater than ten to one attenuation, this yields a transmission range for sensor nodes 14 and vehicle nodes 12 using this band of well over a hundred meters.

However, current regulations of radio bands place some significant barriers to utilizing wireless communications in this range of wavelengths. For example, FCC part 15 places regulations on the 260 MHz-470 MHz band, which limits not merely transmission power but other characteristics of transmission, such as the length of a transmission (5 seconds after releasing a manual transmitter), the type of signal (e.g., no voice transmission), intervals between transmission (30× transmission duration or 10 seconds, whichever is greater), and others. Taken together, these rules have been generally resulted in only the use of simplex (transmit-only) devices such as garage-door openers and security/keyless entry systems.

To comply with the regulations, an embodiment of a monitoring system described herein uses a wireless transmission solution within the 260 MHz-470 MHz band and in compliance with current regulations for this band. For example, as transmissions in this band must only send data with a control code, transmissions between the sensor nodes 14 and vehicle nodes 12 can always include control signals. To this extent, a transmission from a sensor node 14 to a vehicle node 12 can instruct the vehicle node 12 to evaluate the data/alert, transmit an acknowledgement of the data with an instruction to return to sleep, and/or the like. A transmission from the vehicle node 12 to the sensor node 14 can include one or more control signals which subsequently at least temporarily alter operation of the sensor node 12, instruct the sensor node 12 to return to sleep, and/or the like. Additionally, an embodiment of a sensor node 14 and/or a vehicle node 12 can have a sampling and/or transmission timing restricted to no more frequently than once over the course of a minimal time interval between transmission (e.g., every ten seconds).

While illustrative features of the invention have been described primarily in conjunction with a monitoring system for use by freight rail systems, which are primarily concerned with transportation of cargo from point to point, it is understood that embodiments can be implemented in conjunction with transit rail systems. In the case of transit rail, a far greater concern exists with respect to noise pollution and vibration. An embodiment of a monitoring system described herein can be configured to monitor the development of any sources of noise and vibration and trigger alerts whenever they approach a threshold which might present a ride quality or noise pollution issue. In this manner, a transit rail entity can perform maintenance of the system before passengers or neighbors of the transit line become aware of the issue.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for monitoring a railway vehicle comprising:
a sensor node located on the railway vehicle, wherein the sensor node includes:
a power harvesting component for generating power from an ambient condition of the sensor node;
a sensing device for acquiring data corresponding to an operating parameter of the railway vehicle;
means for processing the data acquired by the sensing device, wherein the means for processing is configured to:
monitor for a wake up condition in a sleep state;
enter an active state from the sleep state in response to identifying the wake up condition, wherein the means for processing, in a default cycle of the active state, is configured to:
determine whether a sensor alert condition is present from the data acquired by the sensing device, wherein the sensor alert condition requires evaluation by a vehicle node;
return to the sleep state without transmitting any message to the vehicle node in response to a determination that the sensor alert condition is not present;
provide a sensor alert for processing on the vehicle node in response to a determination that the sensor alert condition is present;
wait for up to a predetermined wait time to receive confirmation from the vehicle node for the sensor alert in response to providing the sensor alert; and
return to the sleep state after waiting, regardless of whether confirmation of the sensor alert is received from the vehicle node.

2. The system of claim 1, wherein, in response to identifying the wake up condition, the means for processing is further configured to:
determine an amount of power available for the default cycle of the active state; and
execute an adjusted cycle of the active state in response to determining the available power is less than a threshold of available power for performing all processing in the default cycle of the active state.

3. The system of claim 1, wherein the sensing device acquires acceleration data.

4. The system of claim 3, wherein the determining includes evaluating the acceleration data for an indication of at least one of: excessive hunting or a derailment.

5. The system of claim 4, wherein the evaluating distinguishes accelerations due to hunting from accelerations due to at least one of: a wheel defect or a track defect.

6. The system of claim 1, further comprising the vehicle node located on the railway vehicle, wherein the vehicle node includes:
a first transceiver for communicating with the sensor node;
a second transceiver for communicating with a management system, wherein the first and second transceivers use distinct wireless communications solutions; and
means for processing the sensor alert received from the sensor node, wherein the means for processing is configured to:
transmit, using the first transceiver, a command directing the sensor node to return to sleep in response to receiving the sensor alert;
acquire additional data regarding the railway vehicle;
process the sensor alert and the additional data to determine whether a vehicle alert condition is present; and
transmit, using the second transceiver, a vehicle alert for processing by the management system in response to determining the vehicle alert condition is present.

7. The system of claim 6, wherein the acquiring additional data includes receiving a second sensor alert from a second sensor node located on the railway vehicle.

8. The system of claim 6, wherein the first transceiver communicates using a first wireless transmission band lower than a second wireless transmission band used by the second transceiver.

9. The system of claim 8, wherein the first wireless transmission band is between 260 MHz-470 MHz.

10. A railway monitoring system comprising:
a vehicle node located on a railway vehicle; and
a plurality of wireless sensor nodes located on the railway vehicle, wherein each of the plurality of wireless sensor nodes includes:
a power harvesting component for generating power from an ambient condition of the wireless sensor node;
a sensing device for acquiring data corresponding to an operating parameter of the railway vehicle;
a transceiver for communicating with the vehicle node;
means for processing the data acquired by the sensing device, wherein the means for processing is configured to:
monitor for a wake up condition in a sleep state;
enter an active state from the sleep state in response to identifying the wake up condition, wherein the means for processing, in a default cycle of the active state, is configured to:
determine whether a sensor alert condition is present from the data acquired by the sensing device, wherein the sensor alert condition requires evaluation by a vehicle node;
return to the sleep state without transmitting any message to the vehicle node in response to a determination that the sensor alert condition is not present;
transmit, using the transceiver, a sensor alert for processing on the vehicle node in response to a determination that the sensor alert condition is present;
wait for up to a predetermined wait time to receive confirmation from the vehicle node for the sensor alert in response to providing the sensor alert; and return to the sleep state after waiting, regardless of whether confirmation of the sensor alert is received from the vehicle node.

11. The system of claim 10, wherein the vehicle node includes:
a first transceiver for communicating with the sensor node;
a second transceiver for communicating with a management system, wherein the first and second transceivers use distinct wireless communications solutions; and
means for processing the sensor alert received from the sensor node, wherein the means for processing is configured to:
transmit a command directing the sensor node to return to sleep in response to receiving the sensor alert;
acquire additional data regarding the railway vehicle;
process the sensor alert and the additional data to determine whether a vehicle alert condition is present; and
transmit a vehicle alert for processing by the management system in response to determining the vehicle alert condition is present.

12. The system of claim 11, wherein the first transceiver communicates using a first wireless transmission band lower than a second wireless transmission band used by the second transceiver.

13. The system of claim 10, wherein the vehicle node includes a power harvesting component for generating power from an ambient condition of the vehicle node.

14. The system of claim 10, wherein the sensing device acquires acceleration data, and wherein the determining includes evaluating the acceleration data for an indication of at least one of: excessive hunting or a derailment, wherein the evaluating distinguishes accelerations due to hunting from accelerations due to at least one of: a wheel defect or a track defect.

15. The system of claim 10, further comprising a trackside sensor node configured to acquire trackside data regarding a passing railway vehicle and transmit a trackside alert for processing by the vehicle node in response to determining a trackside alert condition from the trackside data.

16. A railway monitoring system comprising:
a vehicle node located on a railway vehicle, wherein the vehicle node includes:
a power harvesting component for generating power from an ambient condition of the vehicle node;
a first transceiver for communicating with a plurality of sensor nodes;
a second transceiver for communicating with a management system, wherein the first and second transceivers use distinct wireless communications solutions; and
means for processing a sensor alert received from one of the plurality of sensor nodes, wherein the means for processing is configured to:
transmit, using the first transceiver, a command directing the one of the plurality of sensor nodes to return to sleep in response to receiving the sensor alert;
acquire additional data regarding the railway vehicle;
process the sensor alert and the additional data to determine whether a vehicle alert condition is present; and
transmit a vehicle alert for processing by the management system in response to determining the vehicle alert condition is present; and
a plurality of sensor nodes located on the railway vehicle, wherein each of the plurality of sensor nodes includes:

a power harvesting component for generating power from an ambient condition of the sensor node;

a sensing device for acquiring data corresponding to an operating parameter of the railway vehicle; and a transceiver for transmitting a sensor alert comprising the data corresponding to the operating parameter for processing by the vehicle node, and wherein at least one of the plurality of sensor nodes acquires acceleration data, and wherein the at least one of the plurality of sensor nodes is configured to evaluate the acceleration data for an indication of at least one of: excessive hunting or a derailment.

17. The system of claim 16, wherein at least one of the plurality of sensor nodes further includes means for processing the data corresponding to the operating parameter, wherein the means for processing is configured to:

monitor for a wake up condition in a sleep state;

enter an active state from the sleep state in response to identifying the wake up condition, wherein the means for processing is configured to:

process the data corresponding to the operating parameter to determine whether a sensor alert condition is present that requires the sensor node to transmit the sensor alert for evaluation by the vehicle node; and return to the sleep state in response to at least one of: receiving a command to enter the sleep state from the vehicle node or completing the active state processing.

18. The system of claim 17, wherein the processing the data includes determining whether a minimum required time interval has passed since a previous transmission of a sensor alert by the sensor node.

19. The system of claim 16, wherein the first transceiver communicates using a first wireless transmission band between 260 MHz-470 MHz, and the second transceiver uses a second wireless transmission band distinct from the first wireless transmission band.

20. The system of claim 16, wherein evaluating the acceleration data includes distinguishing accelerations due to hunting from accelerations due to at least one of: a wheel defect or a track defect.

* * * * *